United States Patent
Lee et al.

(10) Patent No.: US 10,703,374 B2
(45) Date of Patent: Jul. 7, 2020

(54) VEHICLE DRIVING ASSISTING APPARATUS AND VEHICLE COMPRISING SAME

(71) Applicant: LG Electronics Inc., Seoul (KR)

(72) Inventors: Jeihun Lee, Seoul (KR); Jeongsuk Yoon, Seoul (KR); Jukyong Jin, Seoul (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 15/574,985

(22) PCT Filed: Apr. 6, 2016

(86) PCT No.: PCT/KR2016/003586
§ 371 (c)(1),
(2) Date: Nov. 17, 2017

(87) PCT Pub. No.: WO2016/186319
PCT Pub. Date: Nov. 24, 2016

(65) Prior Publication Data
US 2018/0154900 A1    Jun. 7, 2018

Related U.S. Application Data

(60) Provisional application No. 62/163,575, filed on May 19, 2015.

(51) Int. Cl.
 *H04N 5/225* (2006.01)
 *B60W 40/02* (2006.01)
(Continued)

(52) U.S. Cl.
CPC .......... *B60W 40/02* (2013.01); *B60R 21/013* (2013.01); *B60R 21/0134* (2013.01);
(Continued)

(58) Field of Classification Search
CPC ... B60W 30/08; B60W 40/02; B60R 21/0134; B60R 21/013; G02B 7/02; H04N 13/239;
(Continued)

(56) References Cited

U.S. PATENT DOCUMENTS 8,106,936 B2    1/2012    Strzempko et al.
9,571,819 B1 *  2/2017    Barron ................. H04N 13/128
(Continued)

FOREIGN PATENT DOCUMENTS

EP      3163506       5/2017
JP      2012185540    9/2012
(Continued)

OTHER PUBLICATIONS

European Search Report in European Appln. 16796646.4, dated Jan. 7, 2019, 14 pages.

*Primary Examiner* — Neil R Mikeska
(74) *Attorney, Agent, or Firm* — Fish & Richardson P.C.

(57) ABSTRACT

The present invention relates to a vehicle driving assisting apparatus comprising: a first camera including a first lens having a first view angle, and acquiring a first image of the front of a vehicle; a second camera including a second lens having a second view angle different from the first view angle, and acquiring a second image of the front of the vehicle; and a processor for detecting an object based on each of the first image and the second image, acquiring stereo images by respectively processing the first image and the second image, and performing a disparity calculation for the front of the vehicle based on the stereo image.

18 Claims, 17 Drawing Sheets

(51) Int. Cl.

| | | |
|---|---|---|
| *G02B 7/02* | (2006.01) | |
| *B60R 21/0134* | (2006.01) | |
| *B60W 30/08* | (2012.01) | |
| *H04N 13/25* | (2018.01) | |
| *H04N 13/133* | (2018.01) | |
| *H04N 13/239* | (2018.01) | |
| *G06T 7/285* | (2017.01) | |
| *B60R 21/013* | (2006.01) | |

(52) U.S. Cl.
CPC ............... *B60W 30/08* (2013.01); *G02B 7/02* (2013.01); *G06T 7/285* (2017.01); *H04N 5/225* (2013.01); *H04N 13/133* (2018.05); *H04N 13/239* (2018.05); *H04N 13/25* (2018.05)

(58) Field of Classification Search
CPC ...... H04N 13/25; H04N 13/133; H04N 5/225; G06T 7/285
See application file for complete search history.

(56) References Cited

U.S. PATENT DOCUMENTS

| | | |
|---|---|---|
| 2010/0283837 A1 | 11/2010 | Oohchida et al. |
| 2011/0158528 A1 | 6/2011 | Yea et al. |
| 2012/0327189 A1 | 12/2012 | Muramatsu et al. |
| 2013/0100256 A1 | 4/2013 | Kirk et al. |
| 2013/0135444 A1 | 5/2013 | Stein et al. |
| 2014/0198184 A1 | 7/2014 | Stein et al. |
| 2014/0214271 A1 | 7/2014 | Choi et al. |
| 2015/0103159 A1* | 4/2015 | Shashua ............ G06K 9/00798 348/118 |
| 2015/0151725 A1* | 6/2015 | Clarke ................ B60W 30/00 701/28 |
| 2015/0210312 A1* | 7/2015 | Stein .................... B60W 30/00 701/41 |
| 2015/0234045 A1* | 8/2015 | Rosenblum .......... G01S 13/931 342/71 |
| 2015/0288948 A1* | 10/2015 | Schamp ................ B60R 1/00 348/47 |
| 2015/0332114 A1* | 11/2015 | Springer ............. G06K 9/4604 348/148 |
| 2015/0334373 A1 | 11/2015 | Kubota et al. |

FOREIGN PATENT DOCUMENTS

| | | |
|---|---|---|
| KR | 101172704 | 8/2012 |
| WO | WO2014148031 | 9/2014 |

* cited by examiner

[FIG. 1]
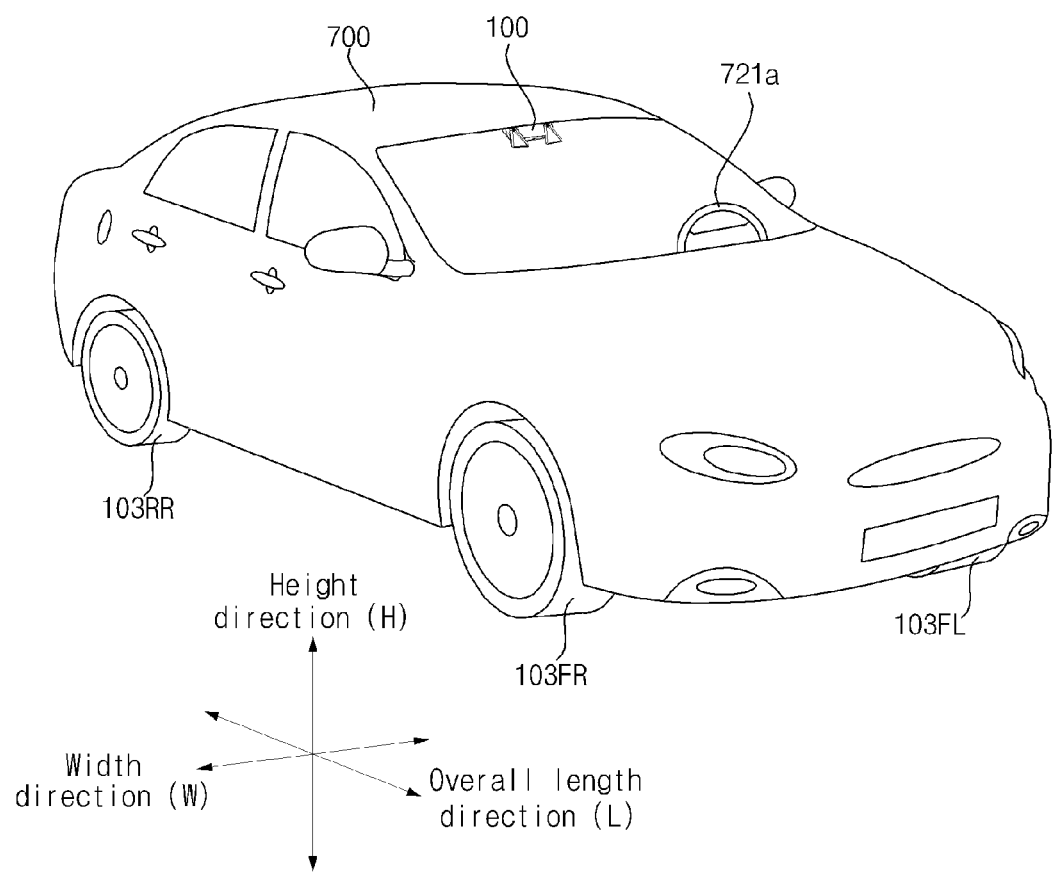

[FIG. 2]
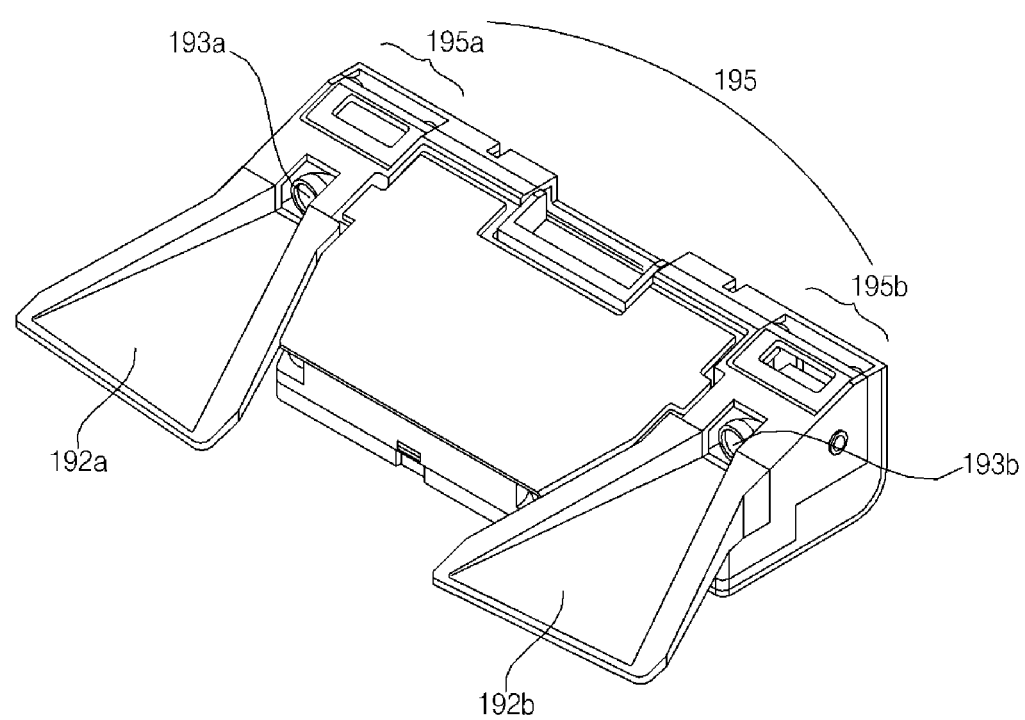

[FIG. 3a]
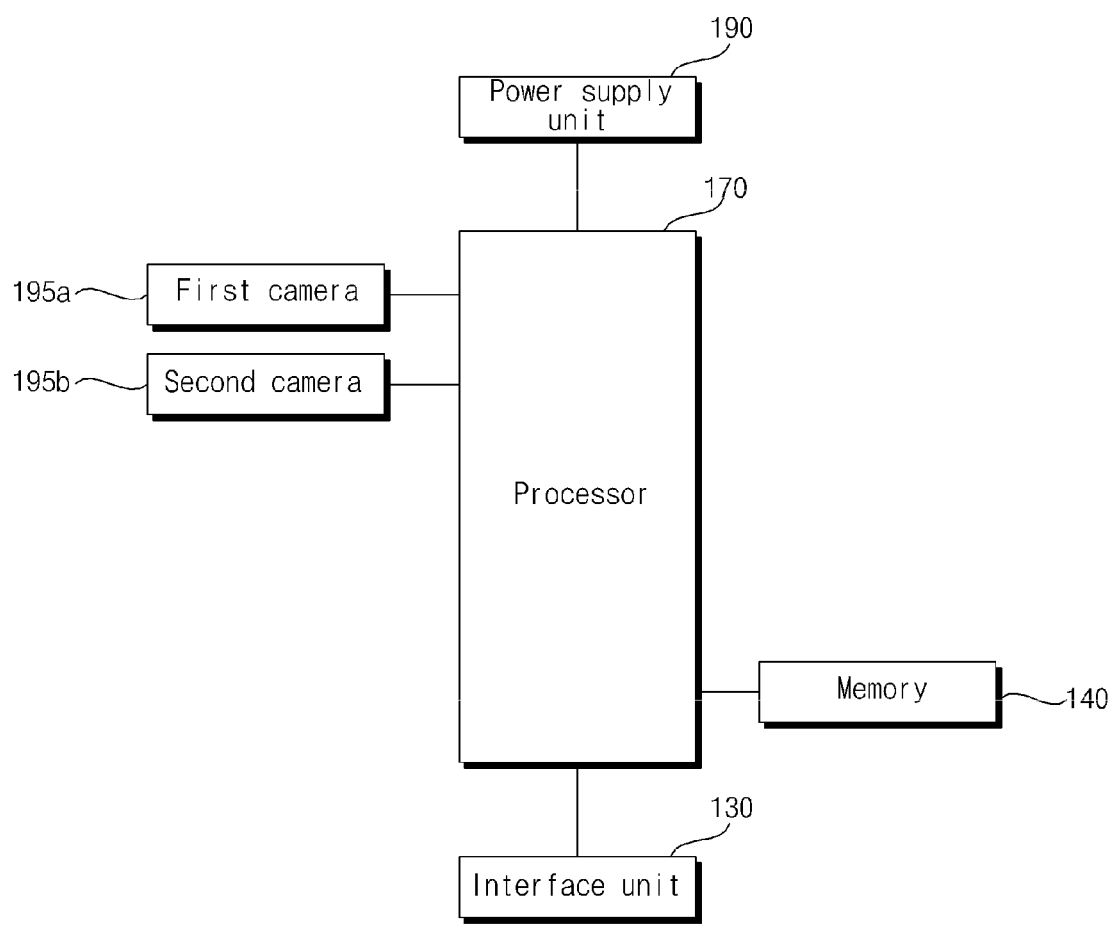

[FIG. 3b]
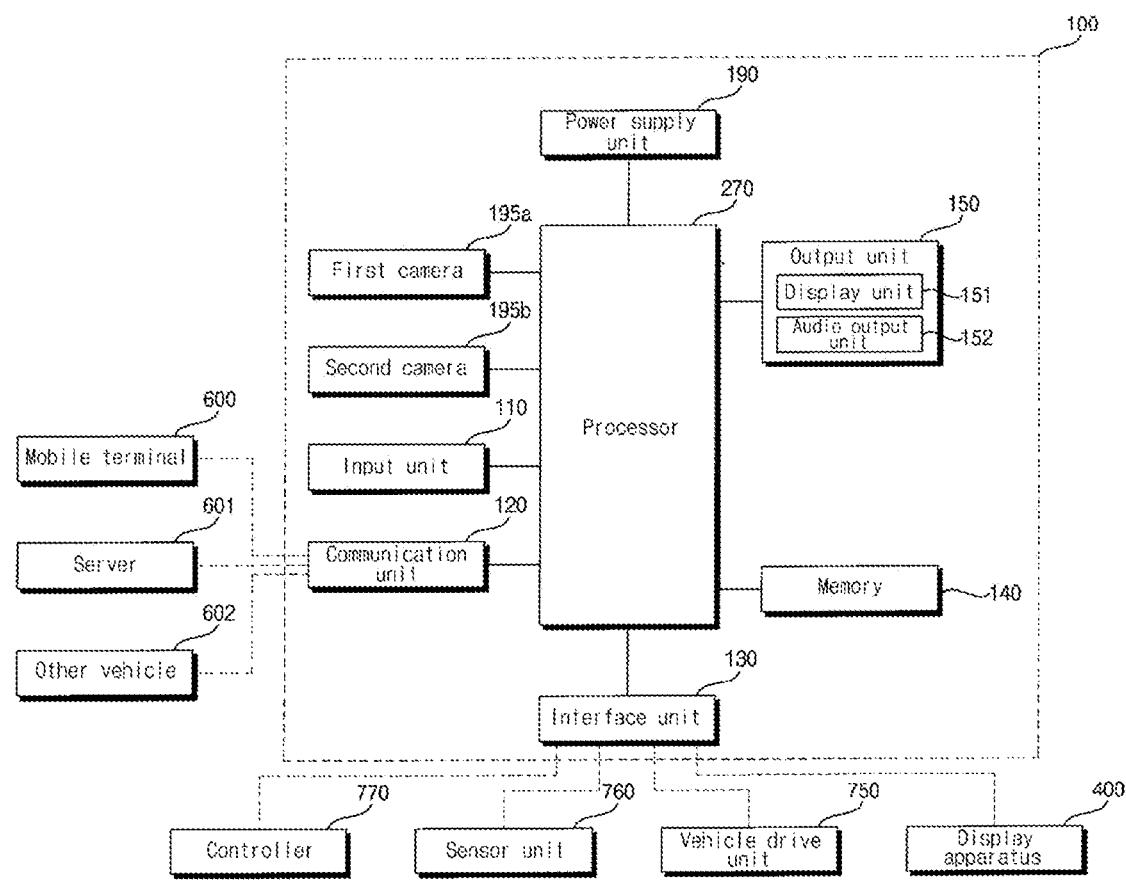

[FIG. 4]
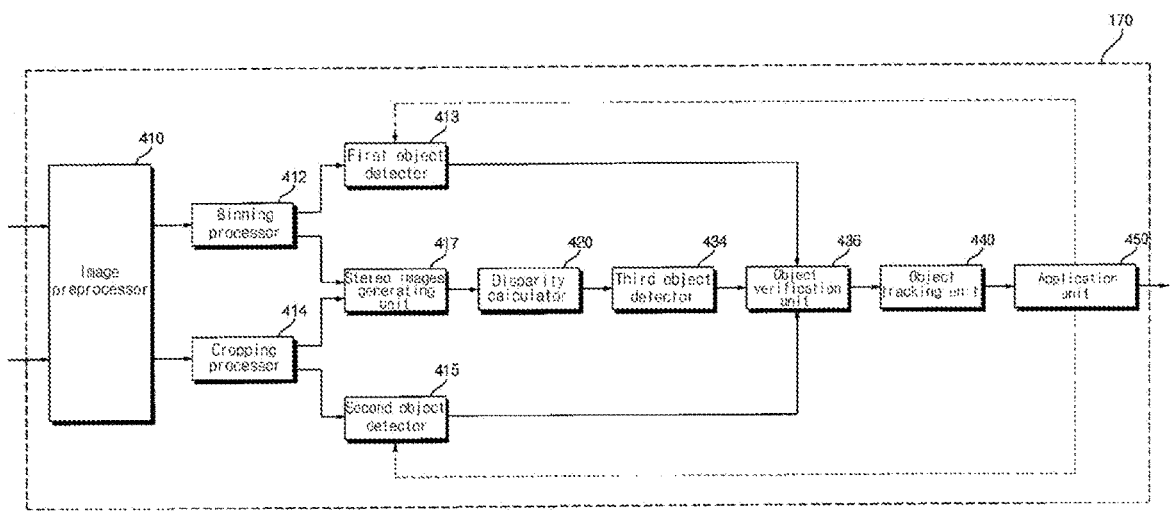

[FIG. 5a]
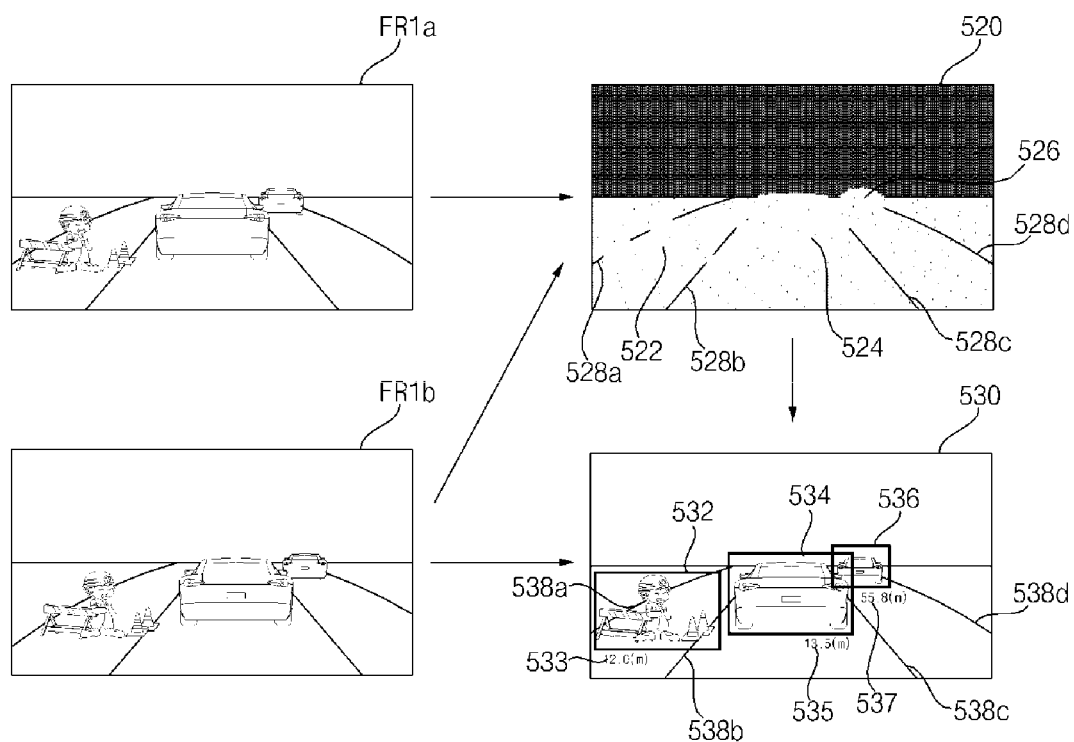

[FIG. 5b]
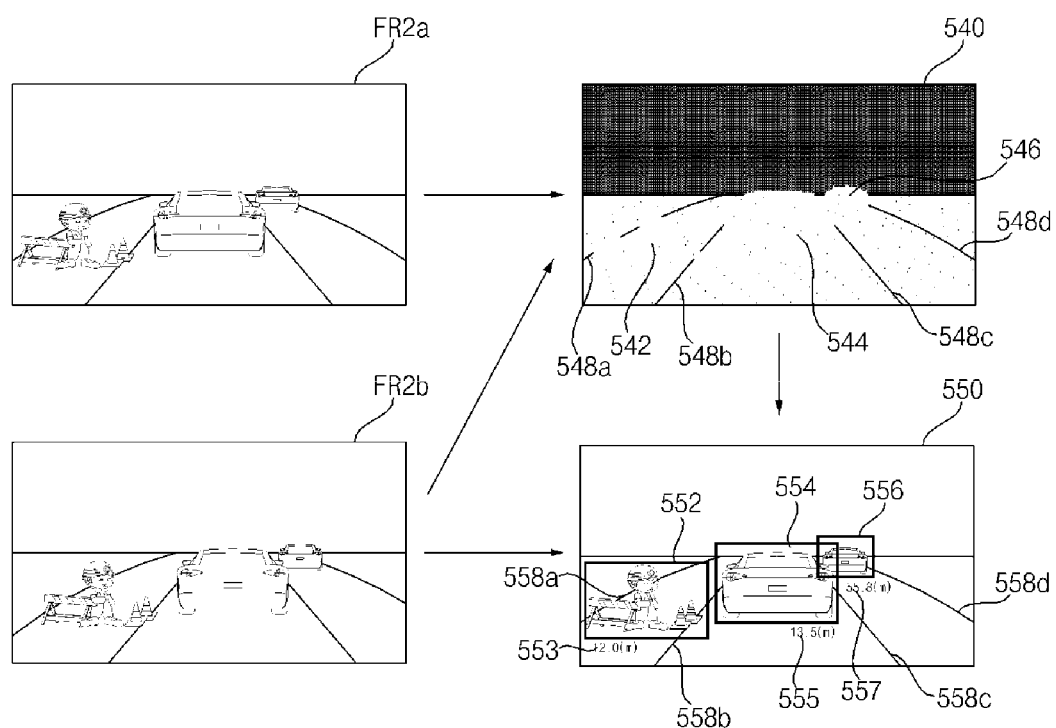

[FIG. 6a]
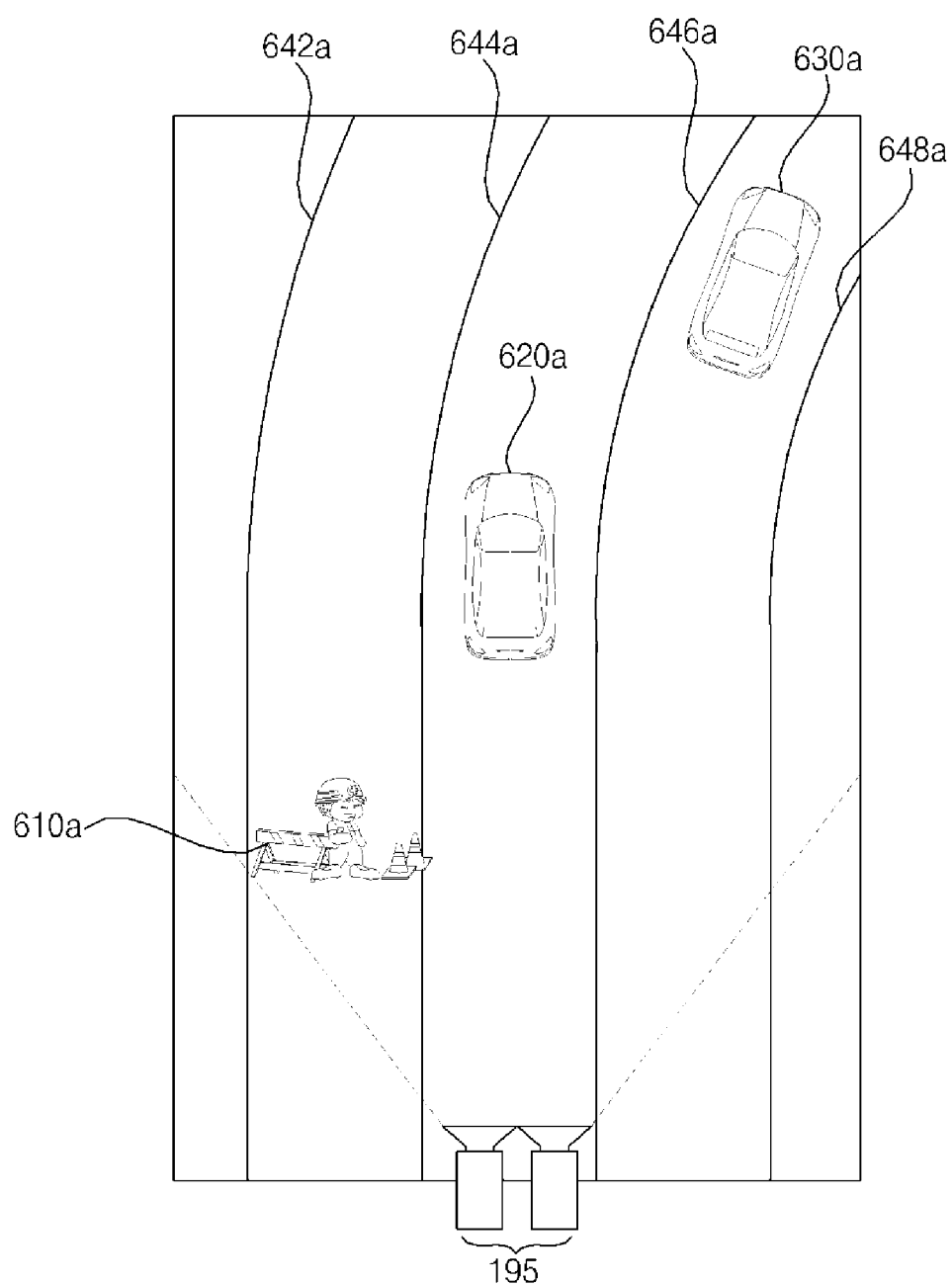

[FIG. 6b]
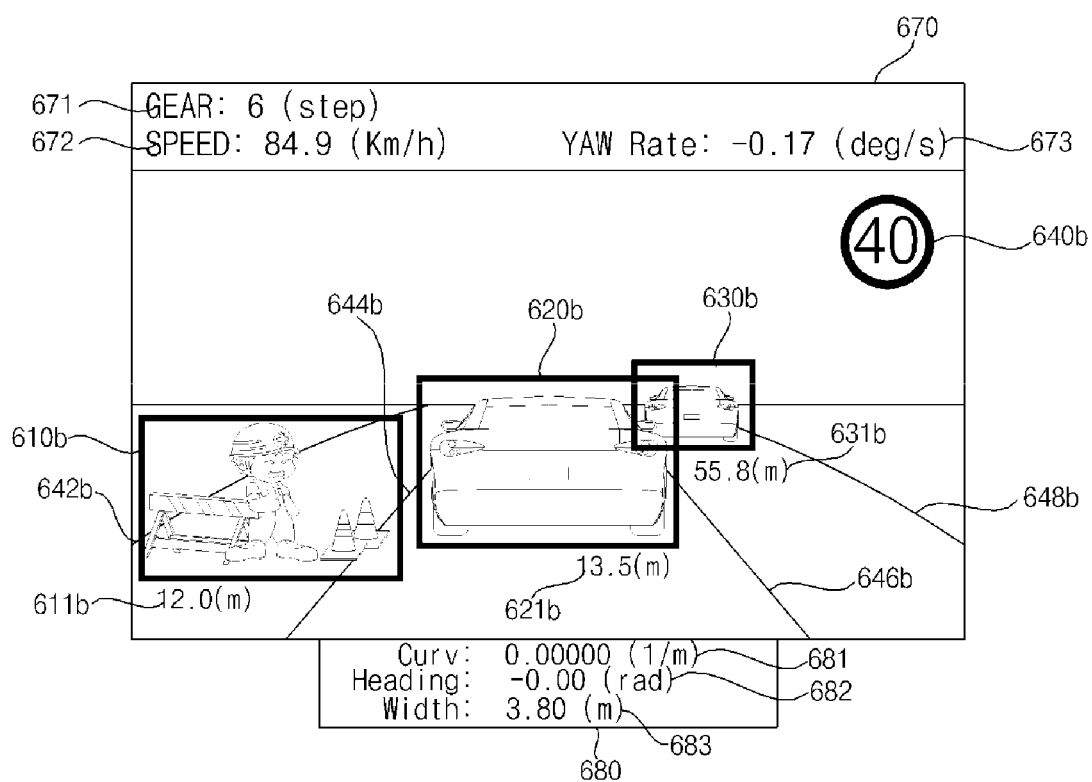

[FIG. 7]
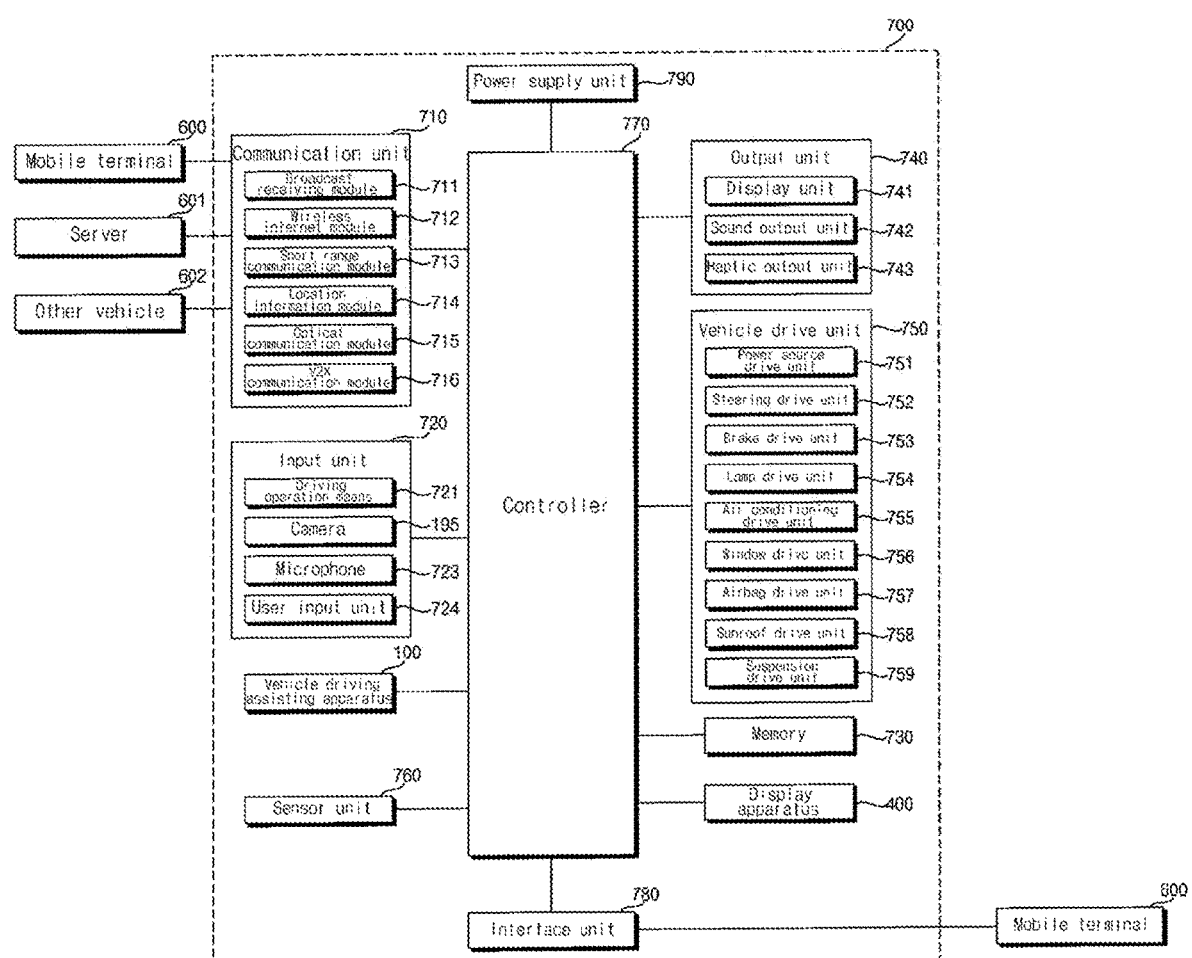

[FIG. 8]
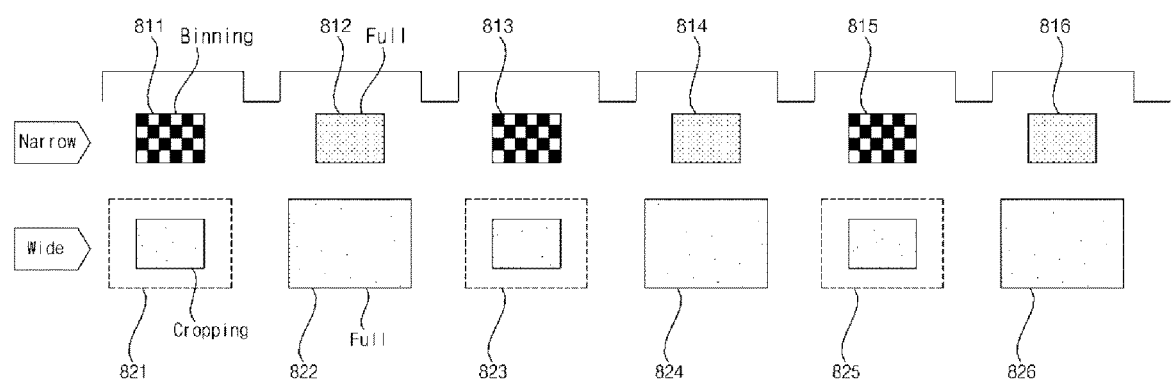

[FIG. 9]
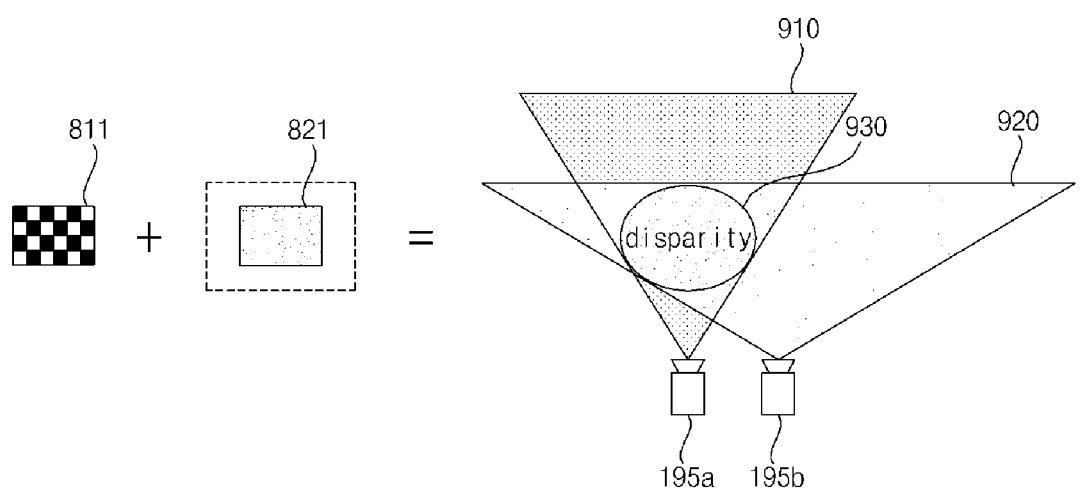

【FIG. 10】
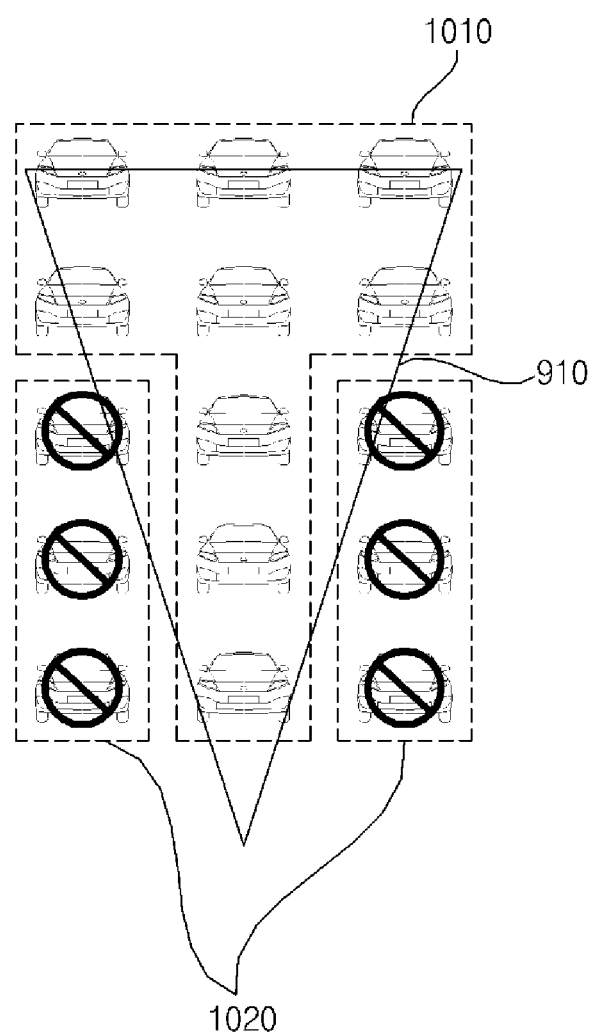

[FIG. 11]
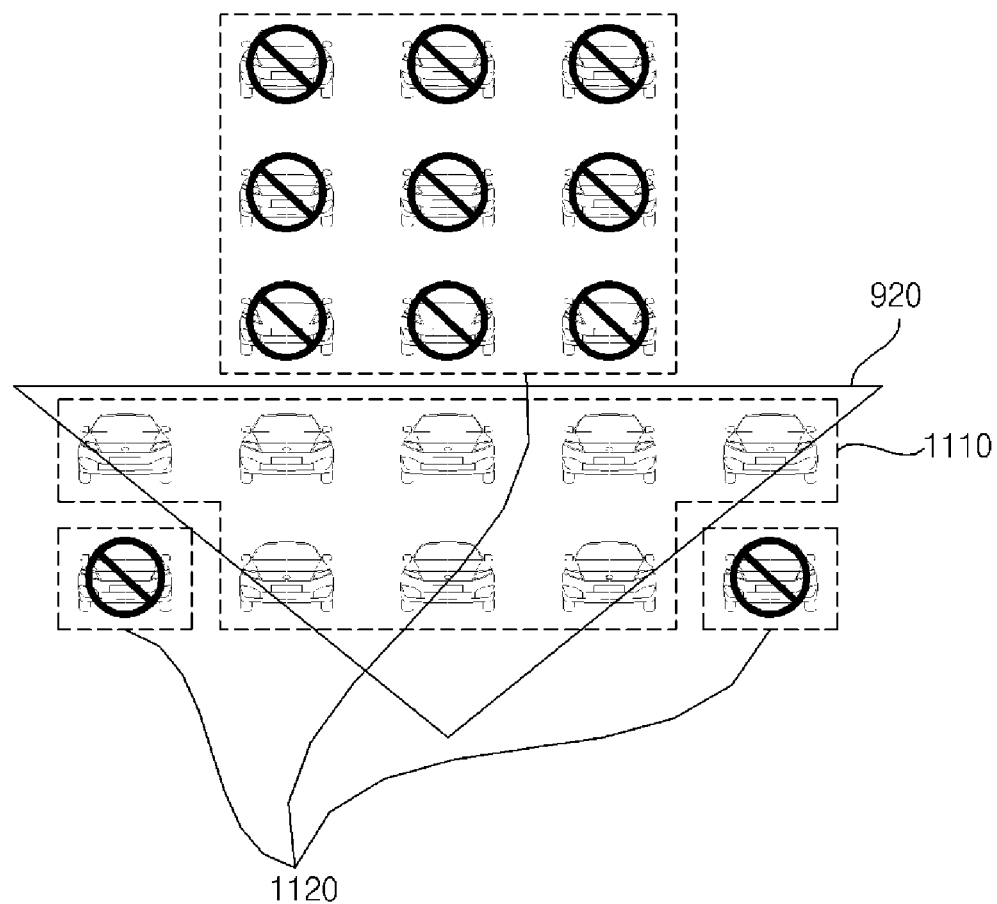

[FIG. 12]
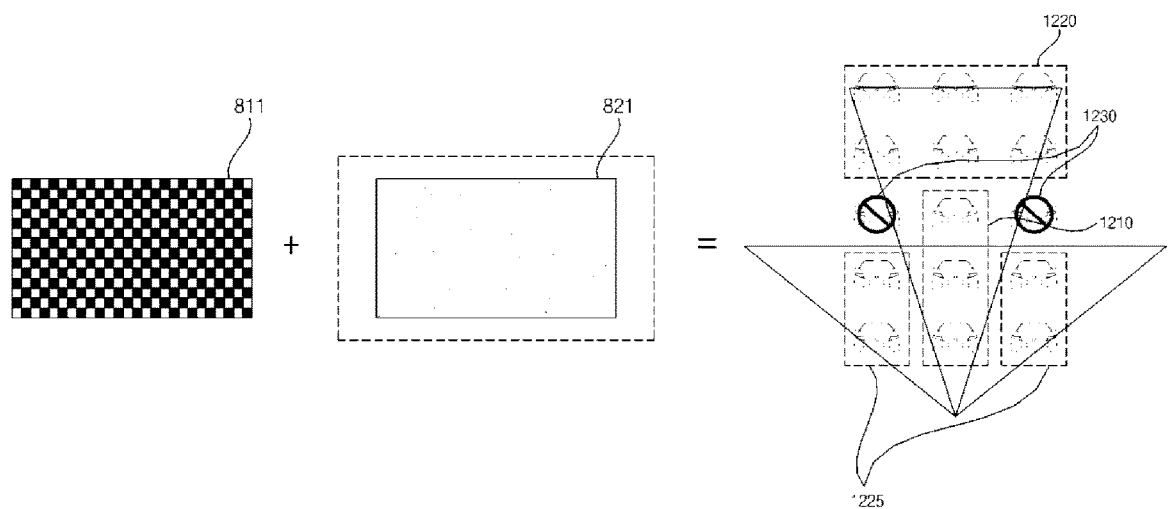

[FIG. 13]
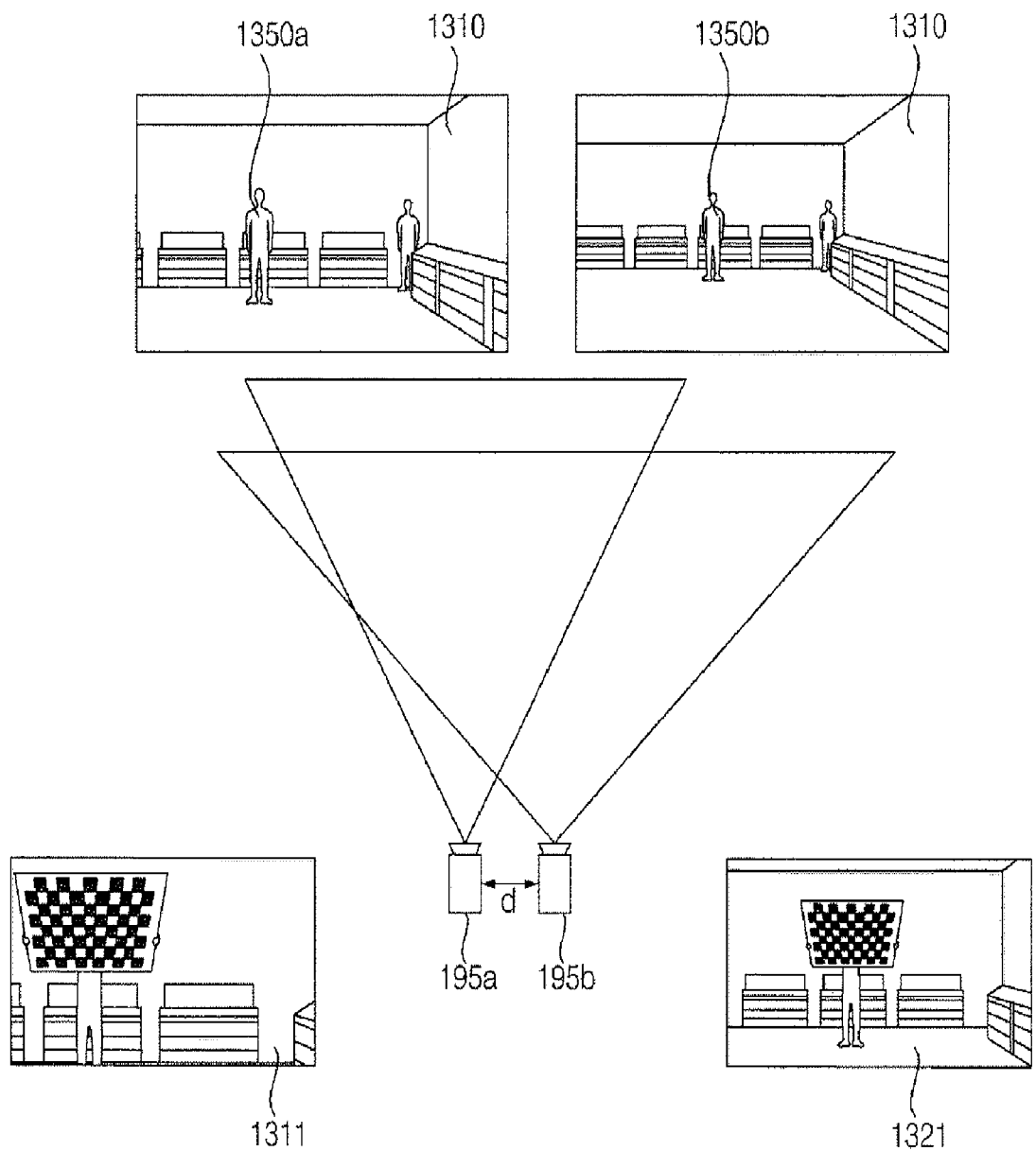

【FIG. 14】
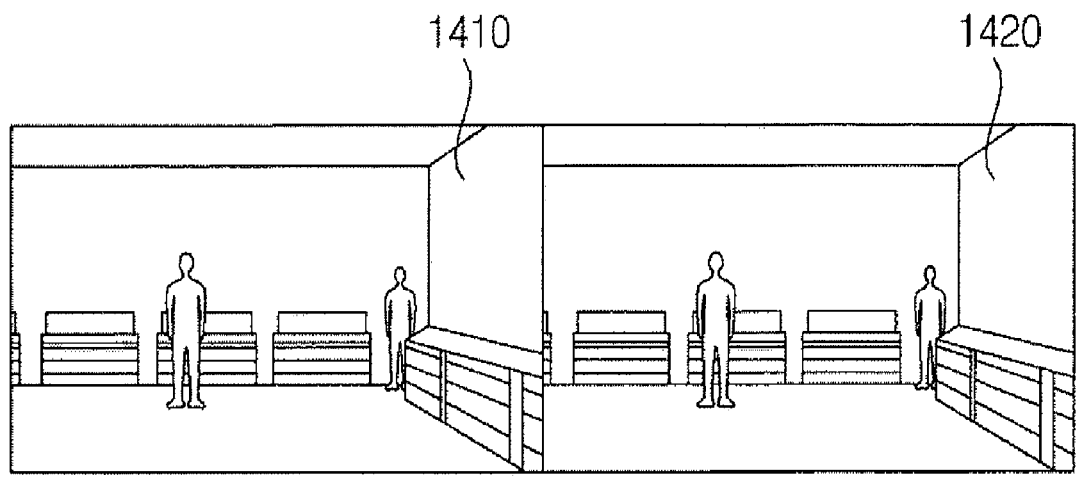
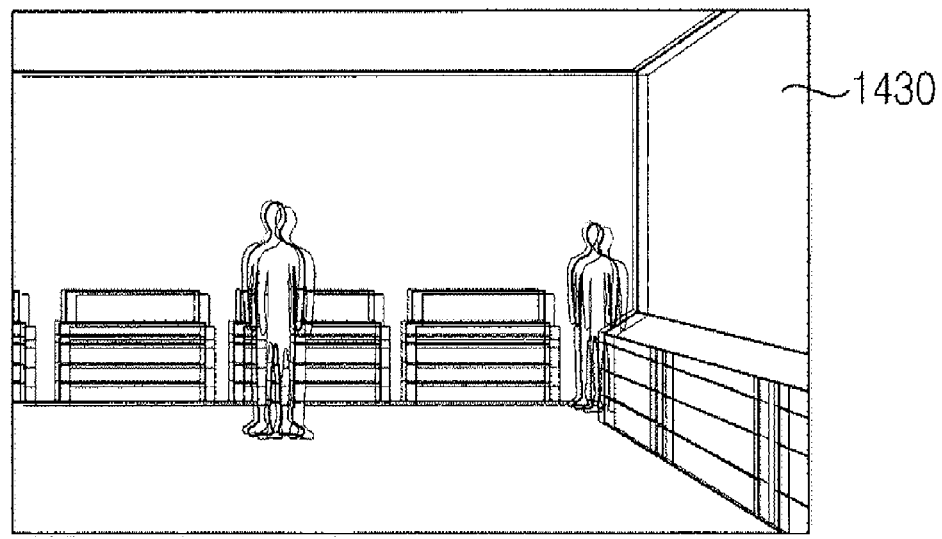

VEHICLE DRIVING ASSISTING APPARATUS AND VEHICLE COMPRISING SAME

CROSS-REFERENCE TO RELATED APPLICATIONS

This application is a National Stage application under 35 U.S.C. § 371 of International Application No. PCT/KR2016/003586, filed Apr. 6, 2016, which claims the benefit of U.S. Provisional Application No. 62/163,575, filed on May 19, 2015. The disclosures of the prior applications are incorporated by reference in their entirety.

TECHNICAL FIELD

The present invention relates to a vehicle driving assisting apparatus and a vehicle including the same.

BACKGROUND ART

A vehicle is an apparatus that allows a user who rides therein to drive the apparatus in a desired direction. A representative example of the vehicle may be a car.

Meanwhile, for convenience of the user who uses the vehicle, the vehicle is provided with, for example, various sensors and electronic apparatuses. In particular, various apparatuses for user driving convenience are being developed.

Recently, as interest in autonomous vehicle has increased, researches on sensor mounted on autonomous vehicle have been actively pursued. The sensor mounted on the autonomous vehicle may include camera, infrared sensor, radar, GPS, Lidar, gyroscope, and the like. Among them, the camera occupies an important position as a sensor that replaces the human eye.

Meanwhile, a stereo camera may be used for the vehicle. A conventional stereo camera uses lenses having the same view angle. A camera including a narrow angle lens is advantageous in detecting a remote distance object, but is disadvantageous in detecting a near distance object. On the contrary, a camera including a wide-angle lens is advantageous in detecting a near distance object, but is disadvantageous in detecting a remote distance object. Since the stereo camera according to the related art uses two cameras having the same view angle, there is a problem in that it cannot be utilized appropriately for both near distance object detection and remote distance object detection.

DISCLOSURE

Technical Problem

The present invention has been made in view of the above problems, and provides a vehicle driving assisting apparatus including two cameras having a different view angle.

The problems of the present invention are not limited to the above-mentioned problems, and other problems not mentioned can be clearly understood by those skilled in the art from the following description.

Technical Solution

In an aspect, there is provided a vehicle driving assisting apparatus, including: a first camera including a first lens having a first view angle, and acquiring a first image of the front of a vehicle; a second camera including a second lens having a second view angle different from the first view angle, and acquiring a second image of the front of the vehicle; and a processor for detecting an object based on each of the first image and the second image, acquiring stereo images by respectively processing the first image and the second image, and performing a disparity calculation for the front of the vehicle based on the stereo image.

In order to achieve the above object, an embodiment of the present invention provides a vehicle including the vehicle driving assisting apparatus.

The details of other embodiments are included in the detailed description and the drawings.

Advantageous Effects

According to the embodiment of the present invention, there is one or more of the following effects.

First, since both the narrow angle camera and the wide-angle camera are included, it is possible to perform both of the near distance object detection and the remote distance object detection.

Secondly, even if two cameras having different view angle are used, an image acquired from two cameras is processed to perform a disparity calculation, so that it is possible to detect the distance to the object and the relative speed.

Third, there is an effect that each camera having a different view angle can be used appropriately in accordance with the traveling state.

Fourth, there is an effect that each camera having different view angle can be used appropriately for an ADAS application system.

The effects of the present invention are not limited to the effects mentioned above, and other effects not mentioned can be clearly understood by those skilled in the art from the description of the claims.

DESCRIPTION OF THE DRAWINGS

FIG. 1 is a diagram illustrating the external appearance of a vehicle according to an embodiment of the present invention.

FIG. 2 is a reference diagram illustrating a vehicle driving assisting apparatus included in the vehicle of FIG. 1 according to an embodiment of the present invention.

FIGS. 3A and 3B illustrate various examples of an internal block diagram of a vehicle driving assisting apparatus according to various embodiments of the present invention.

FIG. 4 illustrates an internal block diagram of a processor of FIGS. 3A and 3B, and FIGS. 5A and 5B are diagrams referenced in an operation description of the processor of FIG. 4.

FIGS. 5A and 5B are reference diagrams illustrating an operation method of the processor 170 of FIG. 4, based on stereo images acquired in a first frame period and a second frame period respectively.

FIGS. 6A and 6B are reference diagrams illustrating an operation of the vehicle driving assistant apparatus shown in FIGS. 3A and 3B.

FIG. 7 is an example of an internal block diagram of a vehicle according to an embodiment of the present invention.

FIG. 8 is a reference diagram illustrating binning processing and cropping processing operations according to an embodiment of the present invention.

FIG. 9 is a reference diagram illustrating an operation of generating stereo images, according to an embodiment of the present invention.

FIG. 10 is a reference diagram illustrating a first image, according to an embodiment of the present invention.

FIG. 11 is a reference diagram illustrating a second image, according to an embodiment of the present invention.

FIG. 12 is a reference diagram illustrating stereo images generated based on a first image and a second image according to an embodiment of the present invention.

FIGS. 13 and 14 are diagrams illustrating an example of a first image, a second image, and stereo images according to an embodiment of the present invention.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated. In general, suffixes such as "module" and "unit" may be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

Terms such as "includes" or "has" used herein should be considered as indicating the presence of several components, functions or steps, disclosed in the specification, and it is also understood that more or fewer components, functions, or steps may likewise be utilized.

A vehicle described in this specification may include a car and a motorcycle. Hereinafter, a description will be given based on a car.

On the other hand, a vehicle as described in this specification may include an internal combustion engine vehicle having an engine as a power source, a hybrid vehicle having an engine and an electric motor as a power source, an electric vehicle having an electric motor as a power source, and the like.

In the following description, the left side of the vehicle means the left side in the traveling direction of the vehicle, and the right side of the vehicle means the right side in the traveling direction of the vehicle.

Unless otherwise mentioned in the following description, a Left Hand Drive (LHD) vehicle shall be mainly described. It is obvious that a RHD vehicle is also included in the scope of the present invention.

FIG. 1 is a diagram illustrating the external appearance of a vehicle according to an embodiment of the present invention.

With reference to the drawing, a vehicle 700 may include wheels 103FR, 103FL, 103RL and the like rotated by a power source, a steering wheel 721a for adjusting the traveling direction of the vehicle 700, and a vehicle driving assisting apparatus 100 provided inside the vehicle 700.

The vehicle driving assisting apparatus 100 may include a stereo camera, and an image acquired by the stereo camera may be signal processed in the processor.

Meanwhile, an overall length means a length from a front portion to a rear portion of the vehicle 700, a width means a breadth of the vehicle 700, and a height means a length from the bottom of the wheel to a roof thereof. In the following description, it is assumed that an overall length direction L is a reference direction in which the overall length of the vehicle 700 is measured, a width direction W is a reference direction in which the width of the vehicle 700 is measured, and a height direction H is a reference direction in which the height of the vehicle 700 is measured.

Meanwhile, in the present invention, the vehicle 700 may be a concept including an autonomous vehicle.

Meanwhile, in the following description, the vehicle 700 may be described as a subject vehicle 700 so as to be described separately from the other vehicles.

FIG. 2 is a reference diagram illustrating a vehicle driving assisting apparatus included in the vehicle of FIG. 1 according to an embodiment of the present invention.

Referring to FIG. 2, the vehicle driving assisting apparatus 100 may include a first camera 195a including a first lens 193a, and a second camera 195b including a second lens 193b. In this case, the first camera 195a and the second camera 195b may be referred to as a stereo camera.

The first lens 193a may be a lens having a first view angle. The second lens 193b may be a lens having a second view angle different from the first view angle.

For example, the first lens 193a may be a narrow angle lens, and the second lens 193b may be a wide angle lens. The narrow angle lens and the wide angle lens may be defined based on the view angle of 60 degrees. The narrow angle lens may be a lens whose view angle is 60 degrees or less. The narrow angle lens may have a view angle of 0 degrees or more. For example, the narrow angle lens may have a view angle of 12 degrees or more and 60 degrees or less. Meanwhile, the narrow angle lens may be referred to as a telephoto lens. The wide angle lens may be a lens having a view angle greater than 60 degrees. The wide angle lens may have a view angle of 180 degrees or less. For example, the wide angle lens may have a view angle of 63 degrees or more and 104 degrees or less.

For example, an image sensor included in the first lens 193a and the first camera 195a may be disposed perpendicular to the ground, so that the first camera 195a can acquire a vehicle front image.

For example, an image sensors included in the second lens 193b and the second camera 195b may be disposed perpendicular to the ground, so that the second camera 195b can acquire the vehicle front image. The second camera 195b may be spaced apart from the first camera 195a by a certain distance in a horizontal direction. Since the first camera 195a and the second camera 195b are disposed apart from each other, disparity calculation may be achieved based on a first image received from the first camera 195a and a second image received from the second camera 195b.

The vehicle driving assistant apparatus 100 may include a first light shield 192a and a second light shield 192b to shield light incident upon the first lens 193a and the second lens 193b respectively. The first light shield 192a may shield a part of the light incident upon the first lens 193a or may guide the light incident upon the first lens 193a. The second light shield 192b may shield a part of the light incident upon on the second lens 193b or guide the light incident upon the second lens 193b. The first light shield 192a and the second light shield 192b may be referred to as a first light guide unit and a second light guide unit.

The vehicle driving assistant apparatus 100 shown in FIG. 2 may be detachably attached to a ceiling or a windshield of the vehicle 700.

FIGS. 3A and 3B illustrate various examples of an internal block diagram of a vehicle driving assisting apparatus according to various embodiments of the present invention.

The vehicle driving assistant apparatus 100 of FIGS. 3A and 3B may signal process the image received from the first camera 195a and the second camera 195b based on computer vision to generate vehicle-related information.

Here, the vehicle-related information may include vehicle control information for direct control of the vehicle, or vehicle driving assisting information for driving guide to the vehicle drive unit.

FIG. 3A illustrates an internal block diagram of the vehicle driving assisting apparatus 100 according to an embodiment of the present invention.

Referring to FIG. 3A, the vehicle driving assistant apparatus 100 of FIG. 3A may include the first camera 195a, the second camera 195b, an interface unit 130, a memory 140, a processor 170, and a power supply unit 190.

The first camera 195a may acquire the first image of the surroundings of the vehicle. For example, the first camera 195a may acquire a first image in front of the vehicle. The first camera 195a may include an image sensor (e.g., CMOS or CCD).

The first image may include a plurality of frames. The first image may further include information on remote distance in comparison with the second image. This is because the first image is photographed by the first camera 195a including the narrow angle lens.

The second camera 195b may acquire the second image of the surroundings of the vehicle. For example, the second camera 195b may acquire the second image in front of the vehicle. The second camera 195b may include an image sensor (e.g., CMOS or CCD).

The second image may include a plurality of frames. The second image may further include information of a wider field of view than the first image. This is because the second image is photographed by the second camera 195b including the wide angle lens.

The first camera 195a and the second camera 195b may include an image processor. The image processor may handle and process a still image or a moving image acquired through the image sensor. In accordance with an embodiment, the image processor may be configured separately from or integrated with the processor 170.

The interface unit 130 may exchange a signal, information, and data with other apparatus in the vehicle 700. The interface unit 130 may receive vehicle-related data or transmit a signal processed or generated by the processor 170 to the outside. To this end, the interface unit 130 may perform data communication with a controller 770, a vehicle display apparatus 400, a sensor unit 760, and a vehicle drive unit 750 in the vehicle in a wired communication fashion or a wireless communication fashion.

The interface unit 130 may receive navigation information by data communication with the controller 770, the vehicle display apparatus 400, or a separate navigation apparatus. Here, the navigation information may include set destination information, path information according to the destination, map information related to vehicle travel, and current location information of vehicle related to vehicle travel. Meanwhile, the navigation information may include location information of vehicle on the road.

Meanwhile, the interface unit 130 may receive sensor information from the controller 770 or the sensor unit 760.

Here, the sensor information may include at least one of vehicle heading information, vehicle location information (GPS information), vehicle angle information, vehicle speed information, vehicle acceleration information, vehicle inclination information, vehicle forward movement/backward movement information, battery information, fuel information, tire information, vehicle lamp information, in-vehicle temperature information, in-vehicle humidity information, and information on whether it is rain or not.

Such sensor information may be acquired from a heading sensor, a yaw sensor, a gyro sensor, a position module, a vehicle forward movement/backward movement sensor, a wheel sensor, a vehicle speed sensor, a vehicle inclination detecting sensor, a battery sensor, a fuel sensor, a tire sensor, a steering sensor for steering wheel rotation, an in-vehicle temperature sensor, an in-vehicle humidity sensor, a rain sensor, and the like. Meanwhile, the position module may include a GPS module for receiving GPS information.

Meanwhile, of the above-specified sensor information, the vehicle heading information, the vehicle location information, the vehicle angle information, the vehicle speed information, and the vehicle inclination information, which are related to vehicle travel, may be referred to as vehicle travel information.

The interface unit 130 may provide a control signal to the controller 770 or the vehicle drive unit 750. Here, the signal may be a control signal. For example, the processor 170 may provide the control signal to a power source drive unit 751, a steering drive unit 752, or a brake drive unit 753 through the interface 130.

The memory 140 may store various data related to overall operation of the vehicle driving assisting apparatus 100, such as programs for processing or control of the processor 170.

The memory 140 may store data for object verification. For example, when a certain object is detected from an image acquired through the first camera 195a and the second camera 195b, the memory 140 may store data for verifying what the object corresponds to, by a certain algorithm.

The memory 140 may store data on traffic information. For example, when certain traffic information is detected from an image acquired through the first camera 195a and the second camera 195b, the memory 140 may store data for verifying what the traffic information corresponds to, by a certain algorithm.

Meanwhile, the memory 140 may be various storage apparatuses such as a ROM, a RAM, an EPROM, a flash drive, a hard drive, and the like in hardware.

The processor 170 may control the overall operation of each unit in the vehicle driving assisting apparatus 100.

The processor 170 may process the vehicle front image or the vehicle surrounding image acquired by the first camera 195a and the second camera 195b. In particular, the processor 170 may perform signal processing based on computer vision. Accordingly, the processor 170 may acquire the front image or the surrounding image of the vehicle from the first camera 195a and the second camera 195b, and perform object detection and object tracking based on the image.

Particularly, when detecting the object, the processor 170 may perform lane detection (LD), vehicle detection (VD), pedestrian detection (PD), bright spot detection (BD), traffic sign recognition (TSR), road surface detection, and the like.

The processor 170 may detect information from the vehicle surrounding image acquired by the first camera 195*a* and the second camera 195*b*.

The information may be information on the traveling state of the vehicle. For example, the information may include road information on a road on which the vehicle drives, traffic regulation information, adjacent vehicle information, vehicle or pedestrian signal light information, construction information, traffic state information, parking lot information, lane information, and the like.

The processor 170 may compare the detected information with the information stored in the memory 140 to verify the information.

Meanwhile, the processor 170 may receive weather information and traffic state information on the road, e.g., transport protocol expert group (TPEG) information through a communication unit 120.

Meanwhile, the processor 170 in the vehicle driving assisting apparatus 100 may grasp, in real time, the traffic state information around vehicle which is grasped based on the image.

Meanwhile, the processor 170 may receive navigation information and the like from the vehicle display apparatus 400 or a separate navigation apparatus (not shown) through the interface unit 130.

Meanwhile, the processor 170 may receive the sensor information from the controller 770 or the sensor unit 760 via the interface unit 130. Here, the sensor information may include at least one of the vehicle heading information, the vehicle location information (GPS information), the vehicle angle information, the vehicle speed information, the vehicle acceleration information, the vehicle inclination information, the vehicle forward movement/backward movement information, the battery information, the fuel information, the tire information, the vehicle lamp information, the in-vehicle temperature information, the in-vehicle humidity information, and the steering wheel rotation information.

The processor 170 may receive the image acquired by the first camera 195*a* and the second camera 195*b*. Here, the acquired image may be a vehicle front image or a vehicle surrounding image.

The processor 170 may detect the object based on the first image received from the first camera 195*a*. The processor 170 may track the detected object. Here, the first image may be a remote distance image of the front of the vehicle acquired by the narrow angle camera 195*a*.

The processor 170 may detect the object based on the second image received from the second camera 195*b*. The processor 170 may track the detected object. Here, the second image may be a near image of the front of the vehicle acquired by the wide-angle camera 195*b*.

For example, a point of reference defining a remote distance and a near distance may be 50 m. For example, the remote distance may be a distance greater than 50 m and less than 300 m based on the vehicle 700. For example, the near distance may be a distance of 0 m or more and 50 m or less based on the vehicle 700. The present invention is not limited thereto.

The processor 170 may process each of the first image and the second image to acquire stereo images. The processor 170 may perform a disparity calculation for the vehicle front, based on the stereo image.

For example, the processor 170 may detect an object in the stereo image. The processor 170 may track the detected object. The processor 170 may calculate the distance to the object, the relative speed with the object, or the speed of the object based on the disparity calculation.

The processor 170 may detect and track the first object based on the first image, as described above. When the distance to the first object calculated based on the disparity calculation becomes equal to or less than a reference value in the state of tracking the first object detected based on the first image, the processor 170, based on the second image, may track the first object.

There is an effect that more accurate object detection can be achieved by adaptively utilizing the first image and the second image according to the distance to the first object. This is because that when the first image is a remote distance image and the second image is a near distance, it is more accurate to detect the object based on the first image in the case of a remote distance and to detect the object based on the second image in the case of a near distance.

The processor 170 may adjust the resolution, the exposure level, and the content of the first and second images when processing the first image and the second image, respectively. In this case, the resolution, the exposure level, and the content of the processed first and second images may coincide with each other. In order to generate stereo images, the resolution, the exposure level, and the content of the two images, which are based on the stereo image, should coincide with each other. The content may mean at least one object included in the image. Two images of one content should be previously secured in order to generate the stereo image.

The processor 170 may perform a binning processing for the first image. The binning processing operation for the first image shall be described in more detail with reference to FIG. 8 and FIG. 9.

The processor 170 may perform a cropping processing for the second image. The cropping processing operation for the second image shall be described in more detail with reference to FIG. 8 and FIG. 9.

The processor 170 may adjust the zoom magnification of camera of the first camera 195*a* or the second camera 195*b*. The first camera 195*a* may include a plurality of zoom lenses and zoom barrels. The second camera 195*b* may include a plurality of zoom lenses and zoom barrels. The processor 170 may adjust the zoom magnification of the first camera 195*a* by adjusting the position of the zoom barrel of the first camera 195*a*. The processor 170 may adjust the zoom magnification of the second camera 195*b* by adjusting the position of the zoom barrel of the second camera 195*b*.

Thus, by adjusting the zoom magnifications of the first camera 195*a* or the second camera 195*b*, the view angles of the first camera 195*a* and the second camera 195*b* may be adjusted to be different from each other or to be identical with each other.

The processor 170 may provide the vehicle drive unit 750 with a control signal based on the object information and the disparity information through the interface unit 130. For example, the processor 170 may provide a control signal to the power source drive unit 751, the steering drive unit 752, or the brake drive unit 753 among the vehicle drive unit 750. The control signal may be provided to the vehicle drive unit 750 via the controller 770 of the vehicle 700.

For example, when the object is detected from the side of the traveling line of the subject vehicle 700 and the distance to the object is equal to or less than a preset distance, the processor 170 may provide the control signal to the power source drive unit 751 to accelerate, so that collision with the object can be avoided.

For example, when the object is detected on the traveling line of the subject vehicle 700 and the distance to the object is equal to or less than a preset distance, the processor 170 may provide the control signal to the steering drive unit 752 to perform steering, so that collision with the object can be avoided.

For example, when the object is detected on the traveling line of the subject vehicle 700 and the distance to the object is equal to or less than a preset distance, the processor 170 may provide the control signal to the brake drive unit 753 to decelerate or stop, so that collision with the object can be avoided.

Among a plurality of Advanced Driver Assistance System (ADAS) applications, the processor 170 may distinguish the ADAS application based on the first image and the ADAS application based on the second image, according to the characteristics of the first image and the second image.

The processor 170 may implement the ADAS application that requires a remote distance image, based on the first image. For example, the processor 170 may implement applications such as Foreword Collision Warning (FCW), Autonomous Emergency Braking (AEB), Adaptive Cruise Control (ACC), or Distronic System (DTR) among the plurality of ADAS applications based on the first image. The Foreword Collision Warning (FCW), the Autonomous Emergency Braking (AEB), the Adaptive Cruise Control (ACC), or the Distronic System (DTR) are applications that consider it important to detect the object located in front of the vehicle within the traveling lane of the subject vehicle 700 at a remote distance. The processor 170 may provide information or data acquired from the first image to the Forward Collision Warning (FCW), the Autonomous Emergency Braking (AEB), the Adaptive Cruise Control (ACC), or the DTR (Distronic System) applications.

Meanwhile, the DTR may be referred to as Distronic Plus or Disronic Plus with steering assist. The DTR may be a technology achieved by integrating a Lane Keeping Assistant System (LKAS) with the ACC.

The processor 170 may implement the ADAS application that requires a wide range of images based on the second image. For example, the processor 170 may implement applications of Cross Traffic Alert (CTA), Traffic Sign Recognition (TSR), and Traffic Jam Assist (TJA) among the plurality of ADAS applications based on the second image. The Cross Traffic Alert (CTA), the Traffic Sign Recognition (TSR), and the Traffic Jam Assist (TJA) are applications that consider it important to detect the object located in a wider area including the traveling lane of the subject vehicle 700 at a near distance. The processor 170 may provide information or data acquired from the second image to the Cross Traffic Alert (CTA), the Traffic Sign Recognition (TSR), and the Traffic Jam Assist (TJA) applications.

The processor 170 may perform the detection of the object located at a remote distance or the object tracking operation based on the first image. The first image is an image acquired based on the narrow angle lens, and is advantageous for the detection or tracking of the object located at a remote distance. It is possible to more accurately detect and track the object located at a remote distance.

The processor 170 may perform the detection of the object located at a near distance or the emergency object detection based on the second image. The second image is an image acquired based on the wide-angle lens, and is an image acquired in a wide field of view. Therefore, the second image is advantageous for the detection of the object located at a near distance or the emergency object detection. It is possible to more accurately detect the object located at a near distance and perform the emergency object detection.

For example, a point of reference defining a remote distance and a near distance may be 50 m. For example, the remote distance may be a distance greater than 50 m and less than 300 m based on the vehicle 700. For example, the near distance may be a distance of 0 m or more and 50 m or less based on the vehicle 700. The present invention is not limited thereto.

The processor 170 may select either the first image or the second image as an image for object detection, based on the traveling speed.

For example, when the vehicle is traveling at a high speed (e.g., when traveling at a speed of 80 km or more per hour), the processor 170 may select the first image as an image for object detection. In the case of high-speed traveling, the remote distance image may be more useful than the near distance image.

For example, when the vehicle is traveling at a low speed (e.g., when traveling at a speed of 50 km or less per hour), the processor 170 may select the second image as an image for object detection. In the case of low-speed traveling, the near distance image may be more useful than the remote distance image.

The processor 170 may select either the first image or the second image as an image for object detection based on the traveling state.

For example, when the traveling road is a highway, the processor 170 may select the first image as an image for object detection. This is because the remote distance image may be more useful than the near distance image on the highway where a high speed traveling is performed.

For example, when the traveling road is a downtown road, the processor 170 may select the second image as an image for object detection. This is because the near distance image may be more useful than the remote distance image on the downtown road where various obstacles exist while a low-speed driving is performed.

For example, if the vehicle is traveling in rain, snow, or foggy conditions, the processor 170 may select the second image as an image for object detection. This is because a wider field of view is required when traveling in rain, snow, or fog.

The processor 170 may be implemented using at least one of application specific integrated circuits (ASIC), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

The processor 170 may be controlled under the control of the controller 770.

The power supply unit 190 may supply power necessary for the operation of each component under the control of the processor 170. Particularly, the power supply unit 190 may receive power from a battery or the like inside the vehicle.

FIG. 3B illustrates an internal block diagram of the vehicle driving assisting apparatus 100 according to an embodiment of the present invention.

Referring to FIG. 3B, in comparison with the vehicle driving assisting apparatus 100 of FIG. 3A, there is a difference in that the vehicle driving assistant apparatus 100 of FIG. 3B further includes an input unit 110, the communication unit 120, and an output unit 150. Hereinafter, the difference shall be mainly described.

The input unit 110 may include a plurality of buttons or a touch screen attached to the vehicle driving assisting apparatus 100, particularly, to the camera 195. It is possible to turn on and operate the vehicle driving assistant 100 through the plurality of buttons or the touch screen. In addition, it is also possible to perform various input operations.

In accordance with an embodiment, the input unit 110 may include a microphone that converts a user voice input into an electrical signal and transmits it to the processor 170.

The communication unit 120 may exchange data with a mobile terminal 600, a server 601, or other vehicle 602 in a wireless fashion. In particular, the communication unit 120 may exchange data with a mobile terminal of the vehicle driver in a wireless fashion. To this end, various wireless data communication protocols, such as Bluetooth, Wi-Fi Direct, Wi-Fi, APiX, NFC, and the like may be used.

The communication unit 120 may receive weather information and road traffic state information, such as Transport Protocol Expert Group (TPEG) information from the mobile terminal 600 or the server 601. Meanwhile, the vehicle driving assistant 100 may transmit the detected real time information to the mobile terminal 600, the server 601, or the other vehicle 602.

Meanwhile, when a user gets into the vehicle, the mobile terminal 600 of the user may perform pairing with the vehicle driving assistant apparatus 100 automatically or by the user executing a pairing application.

The communication unit 120 may receive traffic light change information from the external server 601. Here, the external server 601 may be a server located in a traffic control station that controls traffic.

The output unit 150 may include a display unit 151 and an audio output unit 152.

The display unit 151 may display various information processed by the processor 170. The display unit 151 may display an image related to the operation of the vehicle driving assistant apparatus 100. For this image display, the display unit 151 may include a cluster on the front side of the vehicle interior, a head up display (HUD), or a transparent display disposed close to a windshield. A projection module for projecting an image on the front glass of the vehicle 700 when the display unit 151 is the HUD.

The audio output unit 152 may output a sound to the outside based on the audio signal processed by the processor 170. To this end, the audio output unit 152 may include at least one speaker.

FIG. 4 illustrates an internal block diagram of a processor of FIGS. 3A and 3B, and FIGS. 5A and 5B are diagrams referenced in an operation description of the processor of FIG. 4.

Referring to FIG. 4, the processor 170 may include an image preprocessor 410, a binning processor 412, a first object detector 413, a cropping processor 414, a second object detector 415, stereo images generating unit 417, a disparity calculator 420, a third object detector 434, an object verification unit 436, an object tracking unit 440, and an application unit 450.

The image preprocessor 410 may receive an image from the camera 195 and perform preprocessing.

In detail, the image preprocessor 410 may perform noise reduction, rectification, calibration, color enhancement, color space conversion (CSC), interpolation, and camera gain control for the images. Accordingly, more vivid image than the stereo image photographed by the camera 195 can be acquired.

The binning processor 412 may perform a binning processing for the first image received from the first camera 195*a*. Here, the image input to the binning processor 412 may be an image preprocessed by the image preprocessor 410. The binning processor 412 may convert information of at least two or more pixels basis into information of a single pixel basis in the first image. As described above, the resolution of the binning processed first image may be reduced.

The binning processor 412 may perform a binning processing for some frames that are not consecutive among the first images composed of a plurality of frames.

The first object detector 413 may detect an object based on the first image received from the first camera 195*a*. Here, the image input to the first object detector 413 may be an image preprocessed by the image preprocessor 410.

The first object detector 413 may calculate a distance to the detected object and a relative speed to the object. The first object detector 413 may track the detected object and calculate the distance to the object based on the size of the object that varies with time. The first object detector 413 may calculate the relative speed to the object based on the distance to the object.

The cropping processor 414 may perform a cropping processing for the second image received from the second camera 195*b*. Here, the image input to the cropping processor 414 may be an image preprocessed by the image preprocessor 410. The cropping processor 414 may cut out an unnecessary area of the second image.

The cropping processor 414 may perform the cropping processing for some frames that are not consecutive among the second image composed of a plurality of frames.

The second object detector 415 may detect the object based on the second image received from the second camera 195*b*. Here, the image input to the second object detector 415 may be an image preprocessed by the image preprocessor 410.

The second object detector 413 may calculate the distance to the detected object and the relative speed to the object. The second object detector 415 may track the detected object and calculate the distance to the object based on the object size that varies with time. The second object detector 413 may calculate the relative speed to the object based on the distance to the object.

The stereo image generating unit 417 may generate stereo images based on the binning processed first image and the cropping processed second image. The stereo image generating unit 417 may perform a rectification processing for the binning processed first image or the cropping processed second image to generate stereo images. For example, the processor 170 may adjust the size of one of the binning processed first image and the cropping processed second image to match the size of the image, and then generate stereo images. For example, the processor 170 may adjust the size of both the binning processed first image and the cropping processed second image to match the size of the image, and then generate stereo images.

The disparity calculator 420 may perform stereo matching for the received images and may acquire a disparity map according to the stereo matching. That is, it is possible to acquire disparity information on the stereo image, with respect to the front of the vehicle.

At this time, the stereo matching may be performed on a per pixel basis or a per certain block basis of the stereo images. Meanwhile, the disparity map may mean a map showing binocular parallax information of stereo images, i.e., left and right images, as values.

The third object detector 434 may detect the object.

That is, the object detector 434 may detect the object for at least one of the images based on the disparity information.

Specifically, the object detector 434 may detect the object for at least one of the images.

The object verification unit 436 may classify and verify the detected object.

The object verification unit 436 may classify and verify the object detected by the first object detector 413, the second object detector 415, and the third object detector 434.

To this end, the object verification unit 436 may use a recognition method using a neural network, a support vector machine (SVM) method, a recognition method based on AdaBoost using a Haar-like feature, or a histograms of oriented gradients (HOG) method, or the like.

Meanwhile, the object verification unit 436 may compare the detected object with objects stored in the memory 140 to verify the detected object.

For example, the object verification unit 436 may verify an adjacent vehicle, a lane marker, a road surface, a traffic sign, a dangerous zone, a tunnel, or the like, located around the vehicle.

The object tracking unit 440 may track the verified object. For example, sequentially, the object tracking unit 440 may verify the object in the acquired stereo images, calculate motion or a motion vector of the verified object, and track movement of the object based on the calculated motion or the calculated motion vector. Consequently, the object tracking unit 440 may track an adjacent vehicle, a lane marker, a road surface, a traffic sign, a dangerous zone, a tunnel, or the like located around the vehicle.

Subsequently, the application unit 450 may calculate a risk of the vehicle 200 based on various objects, such as an adjacent vehicle, a lane marker, a road surface, and a traffic sign, located around the vehicle. In addition, the application unit 450 may calculate a possibility of a rear-end collision with a preceding vehicle, slip of the vehicle, or the like.

In addition, the application unit 450 may output a message informing a user of the following information as vehicle driving assisting information based on the calculated risk, the calculated possibility of the rear-end collision, or the calculated slip of the vehicle. Alternatively, the application unit 450 may generate a control signal for posture control or travel control of the vehicle 200 as vehicle control information.

Meanwhile, in accordance with an embodiment, the processor 170 may include some of the image preprocessor 410, the disparity computing unit 420, a segmentation unit 432, the object detector 434, the object verification unit 436, the object tracking unit 440, and the application unit 450.

FIGS. 5A and 5B are reference diagrams illustrating an operation method of the processor 170 of FIG. 4, based on stereo images acquired in a first frame period and a second frame period respectively.

First, referring to FIG. 5A, the stereo camera 195 may acquire stereo images during the first frame period.

The disparity calculator 812 of the processor 170 may receive stereo images FR1a and FR1b signal-processed by the image preprocessor 811 and perform stereo matching for the received stereo images FR1a and FR1b to acquire a disparity map 520.

The disparity map 520 shows a parallax between the stereo images FR1a and FR1b as levels. When a disparity level is high, the distance to the vehicle may be calculated as being short. When a disparity level is low, on the other hand, the distance to the vehicle may be calculated as being long.

Meanwhile, in a case in which the disparity map is displayed, the disparity map may be displayed with higher brightness when the disparity level is higher and the disparity map may be displayed with lower brightness when the disparity level is lower.

FIG. 5A illustrates that in the disparity map 520, first to fourth lane markers 528a, 528b, 528c, and 528d have their own disparity levels and a construction zone 522, a first preceding vehicle 524, and a second preceding vehicle 526 have their own disparity levels.

The segmentation unit 432, the object detector 434, and the object verification unit 436 may respectively perform segmentation, object detection, and object verification for at least one of the stereo images FR1a and FR1b based on the disparity map 520.

FIG. 5A illustrates that object detection and object verification for the second stereo image FR1b are performed using the disparity map 520.

That is, object detection and object verification for first to fourth lane markers 538a, 538b, 538c, and 538d, a construction zone 532, a first preceding vehicle 534, and a second preceding vehicle 536 in an image 530 may be performed.

Referring now to FIG. 5B, the stereo camera 195 may acquire stereo images during the second frame period.

The disparity calculator 420 of the processor 170 may receive stereo images FR2a and FR2b signal-processed by the image preprocessor 410 and perform stereo matching for the received stereo images FR2a and FR2b to acquire a disparity map 540.

FIG. 5B illustrates that, in the disparity map 540, first to fourth lane markers 548a, 548b, 548c, and 548d have their own disparity levels and a construction zone 542, a first preceding vehicle 544, and a second preceding vehicle 546 have their own disparity levels.

The segmentation unit 432, the object detector 434, and the object verification unit 436 may respectively perform segmentation, object detection, and object verification for at least one of the stereo images FR2a and FR2b based on the disparity map 540.

FIG. 5B illustrates that object detection and object verification for the second stereo image FR2b may be performed using the disparity map 540.

That is, object detection and object verification for first to fourth lane markers 558a, 558b, 558c, and 558d, a construction zone 552, a first preceding vehicle 554, and a second preceding vehicle 556 in an image 550 may be performed.

Meanwhile, the object tracking unit 440 may track the objects verified based on comparison between FIGS. 5A and 5B.

Specifically, the object tracking unit 440 may track movement of the objects verified in FIGS. 5A and 5B based on motion or motion vectors of the objects. Consequently, the object tracking unit 440 may track the lane markers, the construction zone, the first preceding vehicle, and the second preceding vehicle located around the vehicle.

FIGS. 6A and 6B are reference diagrams illustrating an operation of the vehicle driving assistant apparatus shown in FIGS. 3A and 3B.

FIG. 6A illustrates a front state of vehicle photographed by the stereo camera 195 provided in the vehicle. In particular, the front state of vehicle may be displayed as a bird eye view.

With reference to the drawing, a first lane marker 642a, a second lane marker 644a, a third lane marker 646a, and a fourth lane marker 648a may be arranged from the left side to the right side. A construction zone 610a may be located between the first lane marker 642a and the second lane marker 644a. A first preceding vehicle 620a may be located between the second lane marker 644a and the third lane marker 646a. A second preceding vehicle 630a may be located between the third lane marker 646a and the fourth lane marker 648a.

FIG. 6B illustrates a front state of vehicle, which is acquired by the vehicle driving assistant apparatus, that is displayed together with various kinds of information. In particular, an image as shown in FIG. 6B may be displayed on the display unit 151 of the vehicle driving assistant apparatus, the vehicle display apparatus 400, or a display unit 741 described later.

FIG. 6B illustrates that information is displayed based on images photographed by the stereo camera 195, unlike FIG. 6A.

With reference to the drawing, a first lane marker 642b, a second lane marker 644b, a third lane marker 646b, and a fourth lane marker 648b may be arranged from the left side to the right side. A construction zone 610b may be located between the first lane marker 642b and the second lane marker 644b. A first preceding vehicle 620b may be located between the second lane marker 644b and the third lane marker 646b. A second preceding vehicle 630b may be located between the third lane marker 646b and the fourth lane marker 648b.

The vehicle driving assistant apparatus 100 may perform signal processing based on stereo images photographed by the stereo camera 195 to verify objects for the construction zone 610b, the first preceding vehicle 620 b, and the second preceding vehicle 630b. In addition, the vehicle driving assistant apparatus 100 may verify the first lane marker 642b, the second lane marker 644b, the third lane marker 646b, and the fourth lane marker 648b.

Meanwhile, FIG. 6B illustrates that, in order to indicate that the objects for the construction zone 610b, the first preceding vehicle 620b, and the second preceding vehicle 630b have been verified, borders of the objects are highlighted.

Meanwhile, the vehicle driving assistant apparatus 100 may calculate distance information for the construction zone 610b, the first preceding vehicle 620b, and the second preceding vehicle 630b based on stereo images photographed by the stereo camera 195.

In the drawing, it is illustrated that the calculated first distance information 611b, calculated second distance information 621b, and calculated third distance information 631b respectively corresponding to the construction zone 610b, the first preceding vehicle 620b, and the second preceding vehicle 630b may be displayed.

Meanwhile, the vehicle driving assistant apparatus 100 may receive sensor information for the vehicle from the controller 770 or the sensor unit 760. In particular, the vehicle driving assistant apparatus 100 may receive and display vehicle speed information, gear information, yaw rate information indicating speed at which a rotational angle (yaw angle) of the vehicle is changed, and vehicle angle information.

FIG. 6B illustrates that vehicle speed information 672, gear information 671, and yaw rate information 673 may be displayed at an upper portion 670 of the vehicle front image and vehicle angle information 682 may be displayed at a lower portion 680 of the vehicle front image. However, various examples may be applicable. In addition, vehicle width information 683, and road curvature information 681 may be displayed together with the vehicle angle information 682.

Meanwhile, the vehicle driving assistant apparatus 100 may receive speed limit information or the like for a road on which the vehicle is traveling through the communication unit 120 or the interface unit 130. In the drawing, it is illustrated that the speed limit information 640b is displayed.

The vehicle driving assistant apparatus 100 may display various information shown in FIG. 6B through the display unit 180, or the like. Alternatively, the vehicle driving assistant apparatus 100 may store various information without separately displaying the information. In addition, the vehicle driving assistant apparatus 100 may utilize the information in various applications.

FIG. 7 is an example of an internal block diagram of a vehicle according to an embodiment of the present invention.

Referring to FIG. 7, the vehicle 700 may include a communication unit 710, an input unit 720, the sensor unit 760, an output unit 740, the vehicle drive unit 750, a memory 730, an interface unit 780, the controller 770, a power supply unit 790, the vehicle driving assisting apparatus 100, and the vehicle display apparatus 400.

The communication unit 710 may include one or more modules that enable to accomplish a wireless communication between the vehicle 700 and the mobile terminal 600, between the vehicle 700 and the external server 601, or between the vehicle 700 and other vehicle 602. In addition, the communication unit 710 may include one or more modules that connect the vehicle 700 to one or more networks.

The communication unit 710 may include a broadcast receiving module 711, a wireless internet module 712, a short range communication module 713, a location information module 714, an optical communication module 715, and a V2X communication module 716.

The broadcast receiving module 711 may receive a broadcast signal or broadcast-related information from an external broadcast management server through a broadcast channel. Here, the broadcast may include a radio broadcast or a TV broadcast.

The wireless internet module 712 refers to a module for wireless internet access, and may be embedded in the vehicle 700 or externally installed. The wireless internet module 712 may be configured to transmit and receive wireless signals in a communication network based on wireless internet technologies.

The wireless internet technologies may include, for example, Wireless LAN (WLAN), Wireless-Fidelity (Wi-Fi), Wireless Fidelity (Wi-Fi) Direct, Digital Living Network Alliance (DLNA), Wireless Broadband (WiBro) World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like. The wireless internet module 712 may transmit and receive data according to at least one wireless internet technology in a range including internet technologies not listed above. For example, the wireless internet module 712 may exchange data with the external server 601 in a wireless fashion. The wireless internet module 712 may receive weather information and road traffic state information (e.g., Transport Protocol Expert Group (TPEG)) from the external server 601.

The short range communication module 713 is an element for short range communication, and may support short range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB).

The short range communication module 713 may form wireless area networks to perform short range communication between the vehicle 700 and at least one external device. For example, the short range communication module 713 may exchange data with the mobile terminal 600 in a wireless fashion. The short range communication module 713 may receive weather information and road traffic state information (e.g., Transport Protocol Expert Group (TPEG)) from the mobile terminal 600. For example, when a user gets into the vehicle 700, the mobile terminal 600 of the user may perform pairing with the vehicle 700 automatically or by the user executing a pairing application.

The location information module 714 is a module for acquiring the location of the vehicle 700, and a representative example thereof is a Global Positioning System (GPS) module. For example, when utilizing a GPS module, the vehicle may acquire the location of the vehicle by using a signal sent from a GPS satellite.

The optical communication module 715 may include a light emitting unit and a light receiving unit.

The light receiving unit may convert a light signal into an electric signal to receive information. The light receiving unit may include a photodiode (PD) for receiving light. The photodiode may convert light into an electrical signal. For example, the light receiving unit may receive information of a preceding vehicle through the light emitted from the light source included in the preceding vehicle.

The light emitting unit may include at least one light emitting element for converting an electric signal into a light signal. Here, preferably, the light emitting element is an light emitting diode (LED). The light emitting unit may convert the electrical signal into a light signal and transmits it to the outside. For example, the light emitting unit may emit the light signal to the outside through the blinking of the light emitting element corresponding to a certain frequency. According to an embodiment, the light emitting unit may include a plurality of light emitting element arrays. According to an embodiment, the light emitting unit may be integrated with a lamp provided in the vehicle 700. For example, the light emitting unit may be at least one of a head lamp, a tail lamp, a brake lamp, a turn signal lamp, and a side lamp. For example, the optical communication module 715 may exchange data with other vehicle 602 through optical communication.

The V2X communication module 716 is a module for performing wireless communication with the server 601 or other vehicle 602. The V2X module 716 may include a module that can implement vehicle-to-vehicle communication (V2V) or vehicle-to-infrastructure communication (V2I) protocols. The vehicle 700 may perform wireless communication with the external server 601 and other vehicle 602 through the V2X communication module 716.

The input unit 720 may include a driving operation means 721, a camera 195, a microphone 723, and a user input unit 724.

The driving operation means 721 may receive a user input for driving the vehicle 700. The driving operation means 721 may include a steering input means 721a, a shift input means 721b, an acceleration input means 721c, and a brake input means 721d.

The steering input means 721a may receive a forward direction input of the vehicle 700 from a user. The steering input means 721a may be preferably formed in a wheel shape so that steering input can be performed by rotation. According to an embodiment, the steering input means 721a may be formed of a touch screen, a touch pad, or a button.

The shift input means 721b may receive the input of parking (P), drive (D), neutral (N), and reverse (R) of the vehicle 700 from the user. The shift input means 721b may be preferably formed in a lever shape. According to an embodiment, the shift input means 721b may be formed of a touch screen, a touch pad, or a button.

The acceleration input means 721c may receive an input for acceleration of the vehicle 700 from the user. The brake input means 721d may receive an input for deceleration of the vehicle 700 from the user. The acceleration input means 721c and the brake input means 721d may be preferably formed in a pedal shape. According to an embodiment, the acceleration input means 721c or the brake input means 721d may be formed of a touch screen, a touch pad, or a button.

The camera 195 may include an image sensor and an image processing module. The camera 195 may process a still image or a moving image acquired by the image sensor (e.g., CMOS or CCD). The image processing module may process the still image or the moving image acquired through the image sensor, extract necessary information, and transmit the extracted information to the controller 770. Meanwhile, the vehicle 700 may include the camera 195 for photographing a vehicle front image or a vehicle surrounding image, and an internal camera 195c for photographing an in-vehicle image.

The internal camera 195c may acquire an image for a passenger. The internal camera 195c may acquire an image for biometrics of the passenger.

The internal camera 195c may acquire an image of the passenger in the vehicle 700 and detect how many passengers are on board.

Meanwhile, FIG. 7 shows that the camera 195 is included in the input unit 720. However, as described with reference to FIGS. 2 to 6, it may be explained that the camera 195 is included in the vehicle driving assistant apparatus 100.

The microphone 723 may process an external sound signal into electrical data. The processed data may be utilized variously according to the function performed in the vehicle 700. The microphone 723 may convert a voice command of the user into electrical data. The converted electrical data may be transmitted to the controller 770.

Meanwhile, according to an embodiment, the camera 722 or the microphone 723 may be a component included in the sensor unit 760 rather than a component included in the input unit 720.

The user input unit 724 is an element for receiving information from a user. When information is input through the user input unit 724, the controller 770 may control the operation of the vehicle 700 to correspond to the inputted information. The user input unit 724 may include a touch-type input means or a mechanical input means. According to an embodiment, the user input unit 724 may be disposed in a certain area of the steering wheel. In this case, the driver may operate the user input unit 724 by his/her finger, while holding the steering wheel.

The sensor unit 760 may sense a signal relating to the travelling of the vehicle 700 or the like. To this end, the sensor unit 760 may include a collision sensor, a wheel sensor, a speed sensor, an inclination sensor, a weight sensor, a heading sensor, a yaw sensor, a gyro sensor, a position module, a vehicle forward movement/backward movement sensor, a battery sensor, a fuel sensor, a tire sensor, a steering sensor for steering wheel rotation, an in-vehicle temperature sensor, an in-vehicle humidity sensor, a rain sensor, a ultrasonic sensor, a radar, a Light Detection and Ranging (LiDAR), and the like.

Thus, the sensor unit 760 may acquire a sensing signal relating to vehicle collision information, vehicle heading information, vehicle location information (GPS information), vehicle angle information, vehicle speed information, vehicle acceleration information, vehicle inclination information, vehicle forward movement/backward movement information, battery information, fuel information, tire information, vehicle lamp information, in-vehicle temperature information, in-vehicle humidity information, information on whether it is rain or not, steering wheel rotation angle, and the like.

Meanwhile, additionally, the sensor unit 760 may include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The sensor unit 760 may include a biometric information sensor unit. The biometric information sensor unit may sense and acquire the biometric information of the passenger. The biometric information may include fingerprint information, iris-scan information, retina-scan information, hand geometry information, facial recognition information, and voice recognition information. The biometric information sensor unit may include a sensor for sensing the biometric information of the passenger. Here, the internal camera 195c and the microphone 723 may operate as a sensor. The biometric information sensor unit may acquire the hand geometry information and the face recognition information through the internal camera 195c.

The output unit 740 is an element for outputting information processed by the controller 770 and may include the display unit 741, an sound output unit 742, and a haptic output unit 743.

The display unit 741 may display information processed in the controller 770. For example, the display unit 741 may display vehicle-related information. Here, the vehicle-related information may include vehicle control information for direct control of the vehicle, or vehicle driving assisting information for a driving guide to a vehicle driver. In addition, the vehicle-related information may include vehicle state information indicating the current state of the vehicle, or vehicle driving information related to the driving of the vehicle.

The display unit 741 may include at least one of a liquid crystal display (LCD), a thin film transistor-liquid crystal display (TFT LCD), an organic light-emitting diode (OLED), a flexible display, a 3D display, and an e-ink display.

The display unit 741 may have a mutual layer structure with the touch sensor or may be integrally formed to implement a touch screen. This touch screen may serve as the user input unit 724 that provides an input interface between the vehicle 700 and a user while providing an output interface between the vehicle 700 and the user. In this case, the display unit 741 may include a touch sensor that senses a touch for the display unit 741 so as to receive a control command by a touch method. Using this, when a touch is accomplished for the display unit 741, the touch sensor may sense the touch, and the controller 770 may generate a control command corresponding to the touch based on the sensed touch. The content input by the touch method may be a character or a numeral, an instruction in various modes, or a menu item that can be designated.

Meanwhile, the display unit 741 may include a cluster so that the driver can check the vehicle state information or the vehicle driving information while driving. The cluster may be located on a dashboard. In this case, the driver may verify the information displayed in the cluster while keeping his/her eyes ahead of the vehicle.

Meanwhile, according to an embodiment, the display unit 741 may be implemented as a Head Up Display (HUD). When the display unit 741 is implemented as an HUD, information may be output through a transparent display provided in a windshield. Alternatively, the display unit 741 may include a projection module to output information through an image projected onto the windshield.

The sound output unit 742 may convert an electric signal from the controller 770 into an audio signal and output the audio signal. To this end, the sound output unit 742 may include a speaker or the like. The sound output unit 742 may also output a sound corresponding to the operation of the user input unit 724.

The haptic output unit 743 may generate a tactile output. For example, the haptic output unit 743 may operate to vibrate a steering wheel, a seat belt, and a seat so that a user can recognize the output.

The vehicle drive unit 750 may control the operation of various apparatuses of the vehicle. The vehicle drive unit 750 may receive a control signal from the vehicle driving assistant apparatus 100. The vehicle drive unit 750 may control each apparatus based on the control signal.

The vehicle drive unit 750 may include the power source drive unit 751, the steering drive unit 752, the brake drive unit 753, a lamp drive unit 754, an air conditioning drive unit 755, a window drive unit 756, an airbag drive unit 757, a sunroof drive unit 758, and a suspension drive unit 759.

The power source drive unit 751 may perform electronic control of a power source in the vehicle 700.

For example, when a fossil fuel-based engine (not shown) is a power source, the power source drive unit 751 may perform electronic control of the engine. Thus, an output torque of the engine and the like may be controlled. When the power source drive unit 751 is an engine, the vehicle speed may be limited by limiting the engine output torque under the control of the controller 770.

For another example, when an electric motor (not shown) is a power source, the power source drive unit 751 may perform control on the motor. Thus, the rotation speed, the torque, and the like of the motor may be controlled.

The power source drive unit 751 may receive an acceleration control signal from the vehicle driving assistant apparatus 100. The power source drive unit 751 may control the power source according to the received acceleration control signal.

The steering drive unit 752 may perform electronic control of a steering apparatus in the vehicle 700. Thus, the heading direction of the vehicle may be changed. The steering drive unit 752 may receive a steering control signal from the vehicle driving assisting apparatus 100. The steering drive unit 752 may control the steering apparatus to be steered according to the received steering control signal.

The brake drive unit 753 may perform electronic control of a brake apparatus (not shown) in the vehicle 700. For example, the brake drive unit 753 may control the operation of the brakes disposed on the wheels to reduce the speed of the vehicle 700. For another example, the brake drive unit 753 may adjust the heading direction of the vehicle 700 to the left or right by differently operating the brakes respectively disposed on the left wheel and the right wheel. The brake drive unit 753 may receive a deceleration control signal from the vehicle driving assistant apparatus 100. The brake drive unit 759 may control the brake apparatus according to the received deceleration control signal.

The lamp drive unit 754 may control the turn-on/turn-off of the lamps disposed inside and outside the vehicle. In addition, the lamp drive unit 754 may control the intensity, direction, and the like of the light of the lamp. For example, the lamp drive unit 754 may perform a control of the turn signal lamp, the brake lamp, and the like.

The air conditioning drive unit 755 may perform electronic control of an air conditioner (not shown) in the vehicle 700. For example, when the temperature inside the vehicle is high, the air conditioner may be operated to control the cooling air to be supplied into the vehicle.

The window drive unit 756 may perform electronic control of a window apparatus in the vehicle 700. For example, the window drive unit 756 may control the opening or closing of left and right windows on the side of the vehicle.

The airbag drive 757 may perform electronic control of an airbag apparatus in the vehicle 700. For example, in case of danger, the airbag drive 757 may control an airbag to be blown.

The sunroof drive unit 758 may perform electronic control of a sunroof apparatus (not shown) in the vehicle 700. For example, the sunroof drive unit 758 may control the opening or closing of a sunroof.

The suspension drive unit 759 may perform electronic control of a suspension apparatus (not shown) in the vehicle 700. For example, when there is a curvature on the road surface, the suspension drive unit 759 may control the suspension apparatus to reduce the vibration of the vehicle 700. The suspension drive unit 759 may receive a suspension control signal from the vehicle driving assistant apparatus 100. The suspension drive unit 759 may control the suspension apparatus according to the received suspension control signal.

The memory 730 may be electrically connected to the controller 770. The memory 730 may store basic data for unit, control data for controlling the operation of unit, and input/output data. The memory 730 may be, in hardware, various storage apparatuses such as a ROM, a RAM, an EPROM, a flash drive, a hard drive, and the like. The memory 730 may store various data for the overall operation of the vehicle 700, such as a program for processing or controlling the controller 770.

The interface unit 780 may serve as a pathway to various kinds of external apparatuses connected to the vehicle 700. For example, the interface unit 780 may include a port that can be connected to the mobile terminal 600, and may be connected to the mobile terminal 600 through the port. In this case, the interface unit 780 may exchange data with the mobile terminal 600.

Meanwhile, the interface unit 780 may serve as a path for supplying electrical energy to the connected mobile terminal 600. The interface unit 780 may provide electric energy supplied from the power supply unit 790 to the mobile terminal 600 under the control of the controller 770 when the mobile terminal 600 is electrically connected to the interface unit 780.

The controller 770 may control the overall operation of each unit in the vehicle 700. The controller 770 may be referred to as an electronic controller (ECU).

The controller 770 may be implemented, in hardware, by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for performing other functions.

The power supply unit 790 may supply power necessary for the operation of the respective components under the control of the controller 770. In particular, the power supply unit 770 may receive power from a battery (not shown) inside the vehicle.

The vehicle driving assisting apparatus 100 may exchange data with the controller 770. A control signal generated by the vehicle driving assistant apparatus 100 may be output to the controller 770. The vehicle driving assistant apparatus 100 may be the vehicle driving assistant apparatus described above with reference to FIGS. 1 to 6B.

The vehicle display apparatus 400 may exchange data with the controller 770. The controller 770 may receive navigation information from the vehicle display apparatus 400 or a separate navigation apparatus (not shown). Here, the navigation information may include set destination information, path information according to the destination, map information related to vehicle travel or current location information of vehicle related to vehicle travel.

FIG. 8 is a reference diagram illustrating binning processing and cropping processing operations according to an embodiment of the present invention.

Referring to FIG. 8, the processor 170 may receive a first image from the first camera 195a. The first image may include a plurality of frames 811, 812, 813, 814, 815, 816, and the like.

The processor 170 may perform a binning processing for the first image. For example, the processor 170 may perform a binning processing for some frames 811, 813, 815, and the like that are not consecutive among the plurality of frames 811, 812, 813, 814, 815, 816, and the like.

The processor 170 may perform a binning processing for the first image based on a second image.

The processor 170 may perform a binning processing for the first image to be synchronized with the second image. For example, the processor 170 may perform a binning processing for the frames 811, 813, 815, and the like of the first image corresponding to the frames 821, 823, 825, and the like that are cropping-processed in the second image.

The processor 170 may perform a binning processing for the first image corresponding to the resolution of the second image. For example, the processor 170 may perform a binning processing for the first image to have the same resolution as the resolution of the second image.

The processor 170 may detect an object based on the first image. For example, the processor 170 may detect an object based on the non-binning processed frames 812, 814, 816, and the like among the plurality of frames 811, 812, 813, 814, 815, 816, and the like.

Since the image of the non-binning processed frame has a higher resolution, it may contain more information. Information on the object may be detected more accurately by detecting the object based on the image of the non-binning processed frame.

The processor 170 may receive the second image from the second camera 195b. The second image may include a plurality of frames 821, 822, 823, 824, 825, 826, and the like.

The processor 170 may perform a cropping processing for the second image. For example, the processor 170 may perform a cropping processing for some frames 821, 823, 825, and the like that are not consecutive among the plurality of frames 821, 822, 823, 824, 825, 826, and the like.

The processor 170 may perform a cropping processing for the second image based on the first image.

The processor 170 may perform a cropping processing for the second image to be synchronized with the first image. For example, the processor 170 may perform a cropping processing for the frames 821, 823, 825, and the like of the second image corresponding to the frames 811, 813, 815, and the like that are binning-processed in the first image.

The processor 170 may perform a cropping processing for the second image corresponding to the content of the first image. For example, the processor 170 may perform a cropping processing for the second image to have the same content as the content of the first image.

The processor 170 may detect an object based on the second image. For example, the processor 170 may detect an object based on the non-cropping processed frames 822, 824, 826, and the like among the plurality of frames 821, 822, 823, 824, 825, 826, and the like.

Since the image of the non-cropping processed frame has a wider field of view, it may contain more information. Information on the object may be detected more accurately by detecting the object based on the image of the non-cropping processed frame.

FIG. 9 is a reference diagram illustrating an operation of generating stereo images, according to an embodiment of the present invention.

Referring to FIG. 9, the processor 170 may process each of the first image and the second image to generate stereo images. The processor 170 may perform a binning processing 811 for the first image and perform a cropping processing 821 for the second image to acquire stereo images 811 and 821. The processor 170 may perform a rectification processing for the binning processed first image or the cropping processed second image to generate stereo images. For example, the processor 170 may adjust the size of one of the binning processed first image and the cropping processed second image to match the size of the image, and then generate stereo images. For example, the processor 170 may adjust the size of both the binning processed first image and the cropping processed second image to match the size of the image, and then generate stereo images.

The processor 170 may perform disparity calculation based on the stereo images 811 and 821.

FIG. 10 is a reference diagram illustrating a first image, according to an embodiment of the present invention.

Referring to FIG. 10, the processor 170 may receive a first image from the first camera 195a. The first image may be a remote distance image in front of the vehicle acquired by the narrow angle camera 195a.

The processor 170 may detect the object located at a remote distance through the first image. The processor 170 may detect the object located at a remote distance, although it cannot detect an object in a horizontally wide field of view, through the first image. In the drawing, reference numeral 910 conceptually indicates a detectable area according to the characteristics of the first camera 195a.

In the first image, the processor 170 may detect an object 1010. The detected object 1010 is detected as it is contained in the first image according to the view angle of the first lens 193a included in the first camera 195a. A non-detected object 1020 is not detected as it is not contained in the first image according to the view angle of the first lens 193a included in the first camera 195a.

FIG. 11 is a reference diagram illustrating a second image, according to an embodiment of the present invention.

Referring to FIG. 11, the processor 170 may receive a second image from the second camera 195b. The second image may be a near distance image in front of the vehicle acquired by the wide angle camera 195b.

The processor 170 may detect, through the second image, an object positioned on the left front side or the right front side of the vehicle among the objects located at a near distance. The processor 170 may detect an object in a horizontally wide field of view, although it cannot detect the object located at a remote distance, through the second image. In the drawing, reference numeral 920 conceptually indicates a detectable area according to the characteristics of the second camera 195b.

In the second image, the processor 170 may detect an object 1110. The detected object 1110 is detected as it is contained in the second image according to the view angle of the second lens 193b included in the second camera 195b. A non-detected object 1120 is not detected as it is not contained in the second image according to the view angle of the second lens 193b included in the second camera 195b.

FIG. 12 is a reference diagram illustrating stereo images generated based on the first image and the second image according to an embodiment of the present invention.

Referring to FIG. 12, the processor 170 may perform a binning processing 811 for the first image, perform a cropping processing 821 for the second image, and then perform a rectification processing to generate stereo images. The processor 170 may perform disparity calculation based on the generated stereo images.

The processor 170 may perform a disparity calculation for an object 1210 detected in the overlapping area of the first image and the second image. Reference numeral 1220 indicates an object that can be detected in the first image but not in the second image. Reference numeral 1225 indicates an object that can be detected in the second image but not in the first image. The processor 170 cannot perform disparity calculation for these objects 1220 and 1225.

Reference numeral 1230 indicates an object that is not detected in any of the first image and the second image.

FIGS. 13 and 14 are diagrams illustrating an example of the first image, the second image, and stereo images according to an embodiment of the present invention.

Referring to FIGS. 13 and 14, the first camera 195a may have a view angle of A degrees. In addition, the first camera 195a may have a focal length corresponding to a view angle of A degrees. A degrees may be smaller than B degrees. The first camera 195a may acquire a first image 1310.

The second camera 195b may have a view angle of B degrees. In addition, the second camera 195b may have a focal length corresponding to a view angle of B degrees. B degrees may be larger than A degrees. The second camera 195b may acquire a second image 1320.

The first camera 195a and the second camera 195b may be spaced apart by a distance d in the horizontal direction.

A first object 1350a and 1350b may be contained in the first image 1310 and the second image 1320. The first object 1350a of the first image 1310 may be larger than the first object 1350b of the second image 1320. That is, the first object 1350b of the second image 1320 may be smaller than the first object 1350a of the first image 1310. The second image 1320 is an image photographed at a wide angle in comparison with the first image 1310.

The second camera 195b may photograph a subject located in a horizontally wider space in comparison with the first camera 195a.

The processor 170 may perform a binning process for the first image and perform a cropping process for the second image.

Thereafter, the processor 170 may perform the rectification processing of the binning processed first image and the cropping processed second image. Reference numeral 1410 indicates the rectification processed first image. Reference numeral 1420 indicates the rectification processed second image.

According to an embodiment, the processor 170 may perform the rectification processing of the binning processed first image based on the cropping processed second image. That is, the processor 170 may perform the rectification processing only for the binning processed first image.

According to an embodiment, the processor 170 may perform the rectification processing of the cropping processed second image based on the binning processed first image. That is, the processor 170 may perform the rectification processing only for the cropping processed second image.

The processor 170 may perform the rectification processing, generate stereo images, and then perform a disparity calculation. The processor 170 may generate a disparity map 1430 through the disparity calculation. The disparity map 1430 is described above with reference to FIGS. 5A to 6B.

The present invention described above can be implemented as computer readable codes on a medium on which a program is recorded. The computer readable medium includes all kinds of recording apparatuses in which data that can be read by a computer system is stored. Examples of the computer readable medium include a hard disk drive (HDD), a solid state disk (SSD), a silicon disk drive (SDD), a ROM, a RAM, a CD-ROM, a magnetic tape, a floppy disk, And may also be implemented in the form of a carrier wave (e.g., transmission over the Internet). In addition, the computer may include the processor 170 or the controller 770. Accordingly, the above detailed description is to be considered in all respects as illustrative and not restrictive. The scope of the present invention should be determined by rational interpretation of the appended claims, and all changes within the scope of equivalents of the present invention are included in the scope of the present invention.

The invention claimed is:

1. A vehicle driving assisting apparatus comprising:
 a first camera including a first lens having a first view angle, and acquiring a first image of a front of a vehicle, wherein the first lens is a narrow angle lens;
 a second camera including a second lens having a second view angle different from the first view angle, and acquiring a second image of the front of the vehicle, wherein the second lens is a wide angle lens; and
 a processor configured to:
  detect an object based on each of the first image and the second image;
  acquire stereo images by respectively processing the first image and the second image; and
  perform a disparity calculation for the front of the vehicle based on the stereo images,
 wherein the processor is further configured to:
  perform a binning process on the first image;
  perform a cropping process on the second image; and
  generate the stereo images based on the binning processed first image and the cropping processed second image,
 wherein the first image comprises a plurality of frames,
 wherein the second image comprises a plurality of frames,
 wherein the processor is configured to perform the binning process on first non-consecutive frames among the plurality of frames in the first image and perform the cropping process on second frames among the plurality of frames in the second image, and
 wherein the first frames correspond to the second frames that were cropping processed in the second image.

2. The vehicle driving assisting apparatus of claim 1, wherein, when processing the first image and the second image respectively, the processor is configured to:
 adjust resolution, exposure level, and content of the first image and the second image and
 process the resolution, the exposure level, and the content of the first image and the second image coincide with each other.

3. The vehicle driving assisting apparatus of claim 1, wherein the processor is configured to detect the object based on a non-binning processed frame among the plurality of frames.

4. The vehicle driving assisting apparatus of claim 1, wherein the processor is configured to perform a binning process of the first image based on the second image.

5. A vehicle driving assisting apparatus comprising:
 a first camera including a first lens having a first view angle, and acquiring a first image of a front of a vehicle, wherein the first lens is a narrow angle lens;
 a second camera including a second lens having a second view angle different from the first view angle, and acquiring a second image of the front of the vehicle, wherein the second lens is a wide angle lens; and
 a processor configured to:
  detect an object based on each of the first image and the second image;
  acquire stereo images by respectively processing the first image and the second image; and
  perform a disparity calculation for the front of the vehicle based on the stereo images,
 wherein the processor is further configured to:
  perform a binning process on the first image;
  perform a cropping process on the second image; and
  generate the stereo images based on the binning processed first image and the cropping processed second image,
 wherein the first image comprises a plurality of frames,
 wherein the second image comprises a plurality of frames,
 wherein the processor is configured to perform the cropping process on first non-consecutive frames among the plurality of frames in the second image and perform the binning process on second frames among the plurality of frames in the first image, and
 wherein the first frames correspond to the second frames that were binning processed in the first image.

6. The vehicle driving assisting apparatus of claim 5, wherein the processor is configured to detect the object based on a non-cropping processed frame among the plurality of frames.

7. The vehicle driving assisting apparatus of claim 5, wherein the processor is configured to perform a cropping process of the second image based on the first image.

8. The vehicle driving assisting apparatus of claim 1, wherein the processor is configured to:
 detect the object from one of the stereo images;
 calculate a distance to the object or a relative speed with the object based on the disparity calculation.

9. The vehicle driving assisting apparatus of claim 8, wherein the processor is configured to track a first object based on the second image, when a distance to the tracked first object is less than or equal to a reference value, in a state of tracking the first object detected based on the first image.

10. The vehicle driving assisting apparatus of claim 1, wherein the processor is configured to adjust a zoom magnification of the first camera or the second camera.

11. The vehicle driving assisting apparatus of claim 1, further comprising an interface unit configured to exchange data with other apparatus,
   wherein the processor is configured to provide a vehicle drive unit with a control signal based on object information and disparity information through the interface unit.

12. The vehicle driving assisting apparatus of claim 11, wherein the processor is configured to provide the control signal to a power source drive unit, a steering drive unit, or a brake drive unit of the vehicle.

13. The vehicle driving assisting apparatus of claim 1, wherein the processor is configured to perform a detection of an object located at a remote distance or an object tracking based on the first image.

14. The vehicle driving assisting apparatus of claim 1, wherein the processor is configured to perform a detection of an object located at a near distance or an emergency object detection based on the second image.

15. The vehicle driving assisting apparatus of claim 1, wherein the processor is configured to select either the first image or the second image as an image for detecting the object, based on a traveling speed of the vehicle.

16. The vehicle driving assisting apparatus of claim 1, wherein the processor is configured to perform a rectification processing for the binning processed first image or the cropping processed second image to generate stereo images.

17. The vehicle driving assisting apparatus of claim 1, wherein the processor is configured to perform a rectification processing of the binning processed first image based on the cropping processed second image.

18. The vehicle driving assisting apparatus of claim 5, wherein the processor is configured to perform a rectification processing of the cropping processed second image based on the binning processed first image.

* * * * *